United States Patent
Jeong et al.

(10) Patent No.: US 11,023,097 B2
(45) Date of Patent: Jun. 1, 2021

(54) MOBILE TERMINAL AND MESSAGE-BASED CONVERSATION OPERATION METHOD FOR GROUPING MESSAGES

(71) Applicant: Samsung Electronics Co., Ltd., Suwon-si (KR)

(72) Inventors: Jinhong Jeong, Yongin-si (KR); Dongjin Yang, Seoul (KR); Jihyun Yeon, Hwaseong-si (KR); Sunggyu Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/132,942

(22) Filed: Sep. 17, 2018

(65) Prior Publication Data

US 2019/0018571 A1 Jan. 17, 2019

Related U.S. Application Data

(63) Continuation of application No. 13/729,723, filed on Dec. 28, 2012, now Pat. No. 10,152,196.

(30) Foreign Application Priority Data

Jan. 5, 2012 (KR) .................. 10-2012-0001354

(51) Int. Cl.
*G06Q 10/10* (2012.01)
*H04M 1/72436* (2021.01)
(Continued)

(52) U.S. Cl.
CPC ....... *G06F 3/04817* (2013.01); *G06Q 10/107* (2013.01); *H04L 51/16* (2013.01); *H04M 1/72436* (2021.01)

(58) Field of Classification Search
CPC .. G06F 3/04817; G06Q 10/107; G06Q 10/10; H04M 1/72552; H04L 51/16; H04L 51/24
(Continued)

(56) References Cited

U.S. PATENT DOCUMENTS 5,923,861 A * 7/1999 Bertram .............. G06F 3/04855
715/786
8,762,885 B2 6/2014 Hwang et al.
(Continued)

FOREIGN PATENT DOCUMENTS

CN 101997964 A 3/2011
CN 102103619 A 6/2011
(Continued)

OTHER PUBLICATIONS

European Decision to Refuse dated Dec. 3, 2018; European Appln. No. 13 150 293.2-1217.
(Continued)

*Primary Examiner* — Daniel Samwel
(74) *Attorney, Agent, or Firm* — Jefferson IP Law, LLP

(57) ABSTRACT

A mobile terminal and message-based conversation operation method for the same are provided. The message-based conversation operation method includes generating message groups by classifying one or more messages exchanged during a message-based conversation according to preset conditions, storing the generated message groups, and outputting display items corresponding to the stored message groups in a dialog window for the message-based conversation.

23 Claims, 16 Drawing Sheets

(51) Int. Cl.
*G06F 3/0481* (2013.01)
*H04L 12/58* (2006.01)
(58) Field of Classification Search
USPC .................................. 715/700–866
See application file for complete search history.

(56) References Cited

U.S. PATENT DOCUMENTS

| | | | |
|---|---|---|---|
| 2002/0073117 A1* | 6/2002 | Newman | H04L 29/06 |
| | | | 715/234 |
| 2002/0152240 A1* | 10/2002 | Kitainik | G06F 3/0481 |
| | | | 715/244 |
| 2005/0267944 A1 | 12/2005 | Little, II | |
| 2005/0268237 A1 | 12/2005 | Crane et al. | |
| 2006/0206566 A1 | 9/2006 | Kelley et al. | |
| 2006/0277258 A1 | 12/2006 | Goldfarb | |
| 2008/0055269 A1 | 3/2008 | Lemay et al. | |
| 2008/0144784 A1* | 6/2008 | Limberg | G06Q 10/107 |
| | | | 379/88.14 |
| 2008/0260241 A1* | 10/2008 | Ye | G06K 9/00409 |
| | | | 382/159 |
| 2008/0281927 A1* | 11/2008 | Vanderwende | G06F 17/2745 |
| | | | 709/206 |
| 2008/0282159 A1* | 11/2008 | Vanderwende | G06F 16/345 |
| | | | 715/700 |
| 2009/0047983 A1 | 2/2009 | Klassen et al. | |
| 2009/0061825 A1 | 3/2009 | Neelakantan et al. | |
| 2009/0319483 A1* | 12/2009 | Consul | H04L 51/22 |
| 2010/0013653 A1 | 1/2010 | Birnbaum et al. | |
| 2010/0014119 A1 | 1/2010 | Lapstun et al. | |
| 2010/0031203 A1* | 2/2010 | Morris | G06F 3/04883 |
| | | | 715/863 |
| 2010/0082759 A1 | 4/2010 | Nalliah et al. | |
| 2010/0099445 A1 | 4/2010 | Song et al. | |
| 2010/0185976 A1* | 7/2010 | Sadanandan | G06F 3/04847 |
| | | | 715/786 |
| 2010/0268712 A1* | 10/2010 | Ngwije | G06F 16/35 |
| | | | 707/737 |
| 2010/0273454 A1 | 10/2010 | Lee et al. | |
| 2010/0332518 A1* | 12/2010 | Song | G06F 3/0483 |
| | | | 707/769 |
| 2011/0231425 A1 | 9/2011 | De Leon et al. | |
| 2011/0258559 A1* | 10/2011 | You | G06Q 10/107 |
| | | | 715/752 |
| 2012/0030566 A1* | 2/2012 | Victor | G06F 3/0482 |
| | | | 715/702 |
| 2012/0180001 A1 | 7/2012 | Griffin et al. | |
| 2012/0185797 A1 | 7/2012 | Thorsen et al. | |
| 2012/0200567 A1* | 8/2012 | Mandel | G06T 11/206 |
| | | | 345/420 |
| 2013/0031175 A1 | 1/2013 | Patel et al. | |
| 2013/0069969 A1 | 3/2013 | Chang et al. | |

FOREIGN PATENT DOCUMENTS

| | | |
|---|---|---|
| EP | 1 603 066 A1 | 12/2005 |
| EP | 2 222 039 A1 | 8/2010 |
| EP | 2 378 750 A1 | 10/2011 |
| JP | 2002-215286 A | 7/2002 |
| JP | 2003-196209 A | 7/2003 |
| JP | 2004-310462 A | 11/2004 |
| JP | 2007-27918 A | 2/2007 |
| JP | 2009-187308 A | 8/2009 |
| JP | 2010-20420 A | 1/2010 |
| KR | 10-2010-0051895 A | 5/2010 |
| KR | 10-2011-0000056 A | 1/2011 |

OTHER PUBLICATIONS

Takaya et al., "Application of Semantic Chat to Groupware for a Knowledge Creative Process," Mutlimedia, Decentralized, Cooperation and Mobile (DICOMO) Symposium Journal 1997-2006 Ver. 1.1, Jul. 5, 2006, pp. 701-704, No. 6, Information Processing Society, Japan.

Patel et al., U.S. Appl. No. 61/513,291 Exhibit B, p. 19.

Chinese Office Action dated Sep. 4, 2019, issued in Chinese Patent Application No. 201710301299.8.

\* cited by examiner

MOBILE TERMINAL AND MESSAGE-BASED CONVERSATION OPERATION METHOD FOR GROUPING MESSAGES

CROSS-REFERENCE TO RELATED APPLICATION(S)

This application is a continuation application of prior application Ser. No. 13/729,723, filed on Dec. 28, 2012, and was based on and claimed priority under 35 U.S.C. § 119(a) of a Korean patent application filed on Jan. 5, 2012 in the Korean Intellectual Property Office and assigned Serial No. 10-2012-0001354, the entire disclosure of which is hereby incorporated by reference.

BACKGROUND OF THE INVENTION

1. Field of the Invention

The present invention relates to a conversation operation in a mobile terminal. More particularly, the present invention relates to an apparatus and method for a message-based conversation operation that collects messages from conversations made during utilization of messaging services and groups the collected messages for easy management.

2. Description of the Related Art

A mobile terminal is a terminal that supports call related functions while providing mobility for the user. Recently, mobile terminals have entered into widespread use because of their convenience and portability thereof. Mobile terminals may provide various input schemes to support user functions. For example, when a mobile terminal has a touchscreen composed of a touch panel and a display part, the user may select a specific image displayed on the display part through the touch panel. In other words, the mobile terminal may generate a touch event corresponding to a user action and execute an application program according to the touch event.

With recent advances in communication networks, the use of messaging services has rapidly increased. For example, users may conduct an instant conversation through dialog windows that display sent and received messages.

Although screen sizes of mobile terminals have increased, the size of the screen is inherently limited due to mobility requirements. Thus, users may still experience inconvenience in manipulating dialog windows containing sent and received messages. For example, when a user of a mobile terminal sends and receives many messages in real-time during a message-based conversation, the mobile terminal is only able to display the latest message because all the exchanged messages cannot be displayed in a single screen having size limitations. To refer to the previous messages, the user must scroll the dialog window. However, because a rapid scroll operation causes rapid message display, which may hinder the user's understanding of message contents, the user must slowly scroll the dialog window. This may cause a delay in finding a desired one of the previous messages, and disrupt the flow of conversation.

Therefore, a need exists for an apparatus and method for classifying messages sent and received during a conversation into groups and storing the messages such that the stored messages may be easily searched and utilized in various ways.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a mobile terminal and message-based conversation operation method for the same wherein messages sent and received during a conversation are classified into groups and stored so that the stored messages may be easily searched and utilized in various ways.

In accordance with an aspect of the present invention, a method for message-based conversation operation is provided. The method includes generating message groups by classifying one or more messages exchanged during a message-based conversation according to preset conditions, storing the generated message groups; and outputting display items corresponding to the stored message groups in a dialog window for the message-based conversation.

In accordance with another aspect of the present invention, a mobile terminal capable of supporting a message-based conversation function is provided. The mobile terminal includes a communication unit for sending and receiving messages for the message-based conversation function, a control unit for generating message groups by classifying one or more messages exchanged during a message-based conversation according to preset conditions, a storage unit for storing the generated message groups, and a display unit for outputting display items corresponding to the stored message groups in a dialog handling window for the message-based conversation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Next, a description is given of the configuration and operation of the present invention. However, it is to be understood that the description is of exemplary embodiments only and that the present invention is not limited to or by the following description. That is, various changes and modifications are possible on the basis of the following description.

Figure 1:
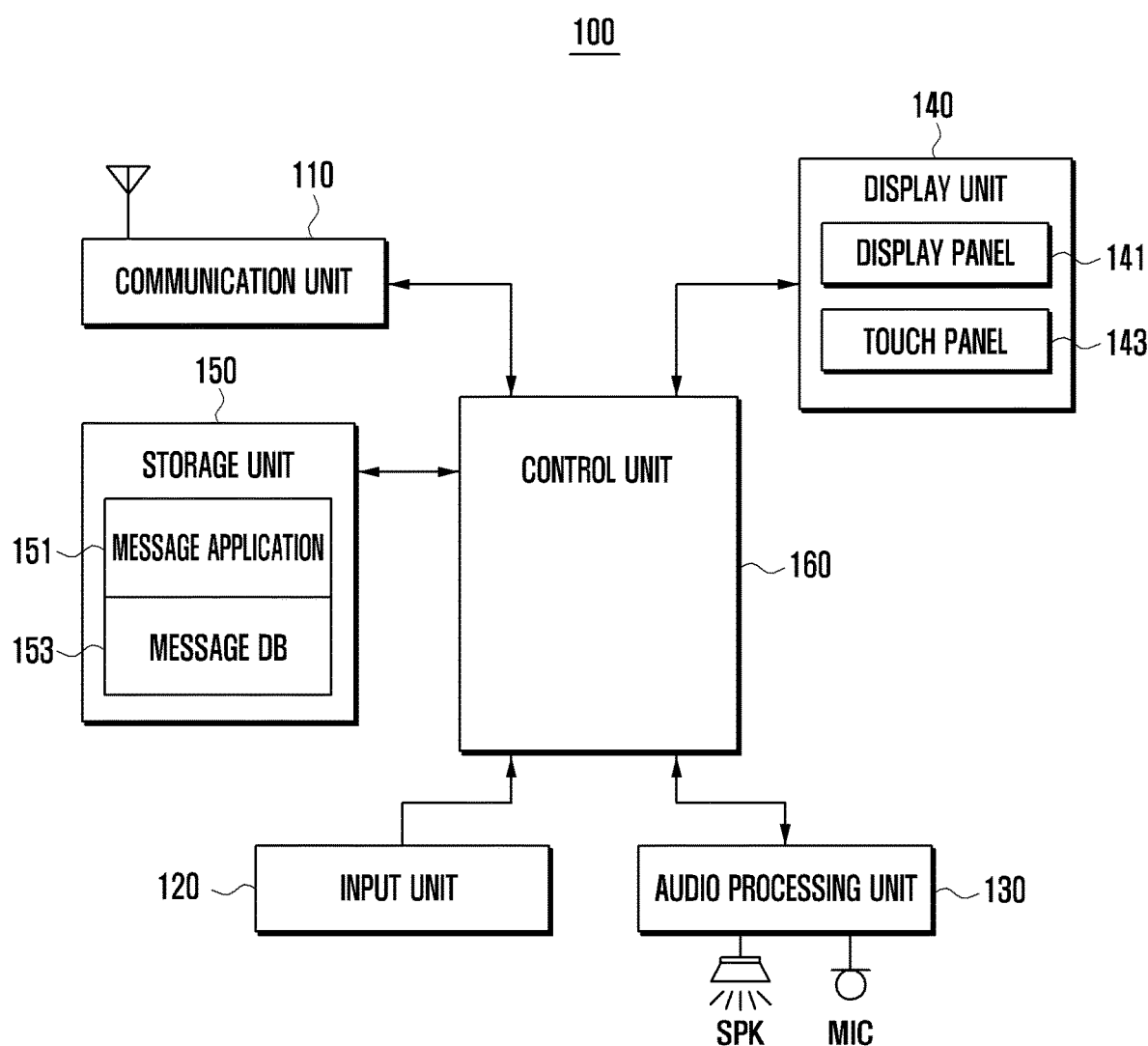
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the mobile terminal 100 may include a communication unit 110, an input unit 120, an audio processing unit 130, a display unit 140, a storage unit 150, and a control unit 160.

The mobile terminal 100 having the above configuration collects messages during a conversation and classifies the collected messages according to preset conditions or user input conditions into message groups. The mobile terminal 100 arranges message groups in a preset form in a dialog window so that the user may easily find a desired message group. When a message group is selected, the mobile terminal 100 may provide a quick view screen for displaying some messages in the selected message group or a detailed view screen for displaying all messages in the selected message group in a full screen format, so that the user may identify message contents in outline or in detail. The mobile terminal 100 enables the user to start a new conversation on the basis of a selected message group. The mobile terminal 100 may output, for a message group, a display item indicating the importance of the message group, and permit the user to insert an information element describing the message group into the display item. As described above, during a message-based conversation, the mobile terminal 100 supports a message manipulation function for creation, display, management, and searching of message groups.

The communication unit 110 establishes a communication channel for voice, video and data communication under the control of the control unit 160. That is, the communication unit 110 may establish a communication channel for a voice call, a data call and a video call to a mobile communication system. More particularly, the communication unit 110 may establish a communication channel to exchange messages for message-based conversation in a messaging service such as text messaging, multimedia messaging or instant messaging. Such a communication channel may include a transmission channel to send a message to a second terminal and a reception channel to receive a message from the second terminal. Here, the transmission channel and the reception channel may use different frequency bands or use the same frequency band.

The communication unit 110 supports message transmission and reception during a conversation, and may send and receive a message group to and from a corresponding terminal according to user selection. Here, to send and receive a message group, the communication unit 110 may use address information of the corresponding terminal indicated by the user. Address information may be saved in advance or newly saved as requested or confirmed by the user.

The input unit 120 includes a plurality of alphanumeric and function keys for inputting alphanumeric information and for setting various functions. The function keys may include direction, side, and shortcut keys associated with specific functions. The input unit 120 generates key signals for user settings and for controlling operations of the mobile terminal 100, and forwards the key signals to the control unit 160. More particularly, the input unit 120 may generate various input signals needed for the message-based conversation function. For example, the input unit 120 may generate an input signal for selecting and activating a conversation function application, an input signal for creating a message during a conversation, and an input signal for receiving a message during the conversation. The input unit 120 may generate input signals for classifying sent and received messages into message groups, for splitting a selected message group, for merging message groups, and for moving and arranging message groups according to user manipulation. The input unit 120 may also generate input signals for finding a desired message group, for selecting and reading a message group, for starting a new conversation with another user on the basis of a selected message group, and for browsing message groups using a quick view screen or a detailed view screen.

Some input signals may be touch events generated by a touch panel 143 of the display unit 140 (described later). Hence, the input means may include not only the input unit 120 containing key buttons but also the touch panel 143. When the display unit 140 is a touchscreen, the input unit 120 may be realized using a QWERTY key map, a Dvorak key map, a 3*4 key map, a 4*3 key map, and the like, which are displayable on the display unit 140.

The audio processing unit 130 includes a speaker (SPK) for outputting audio data during a call, outputting audio data contained in a message and outputting audio data stored in the storage unit 150, and a microphone (MIC) for collecting an audio signal such as a voice signal during a call. More particularly, the audio processing unit 130 may output a sound effect indicating message reception during a conversation, output a sound effect indicating message selection, and generate sounds corresponding to message contents according to user settings. These functions may be turned off according to user settings.

The display unit 140 includes a display panel 141 and the touch panel 143. In an exemplary implementation, the touch panel 143 may be placed on the front surface of the display panel 141.

The display panel 141 displays various menus of the mobile terminal 100, information input by the user, information to be provided to the user, and the like. For example, the display panel 141 may output various screens related to usage of the mobile terminal 100, such as an idle screen, a message composition screen, a call handling screen, and the like. The display panel 141 may be realized using Liquid Crystal Display (LCD) devices, Organic Light Emitting Diodes (OLED), and the like. The display panel 141 may be placed above or below the touch panel 143.

More particularly, the display panel 141 may output various screens or windows during a conversation. For example, the display panel 141 may output a screen for writing a message in a conversation, a screen for sending the written message, a screen for receiving a message, a screen for outputting one or more message groups as display items in specific forms, a screen for quickly viewing message groups, a screen for viewing message groups in detail, a screen for displaying display items associated with message groups, and the like. The display panel 141 may output a screen for splitting a message group, a screen for merging message groups, a screen for moving message groups, a screen for arranging message groups, and the like.

The touch panel 143 is placed above and/or below the display panel 141, and may generate a touch event according to contact by an object like a finger and forward the generated touch event to the control unit 160. Sensing elements constituting the touch panel 143 are arranged in a matrix form, and send information on the coordinates and type of a touch event occurring on the touch panel 143 to the control unit 160.

More particularly, the touch panel 143 may configure various touch regions to generate touch events during a message-based conversation. For example, the touch panel 143 may allocate character regions at suitable portions of a message composer so that the user may write a message by touching the character regions. The touch panel 143 may generate various touch events for creating, managing, and searching message groups according to user actions and send the touch events to the control unit 160. Touch events generated by the touch panel 143 for manipulating message groups are described in more detail later with reference to the drawings.

The storage unit 150 may store application programs realizing functions of the mobile terminal 100, application programs realizing user functions, key maps and menu maps for proper operation of the display unit 140, and the like. The key maps and menu maps may take various forms. More particularly, the storage unit 150 may include a conversation function application 151 for realizing message-based conversation and a conversation information database 153 for maintaining messages and message groups in conversations.

The conversation function application 151 supports creation, display, management and searching of message groups in conversations. The conversation function application 151 may be activated according to user selection or configuration settings and may generate a message and display a received message in a conversation after activation. The conversation function application 151 may classify multiple messages into message groups in response to an input signal such as a touch event, and output display items corresponding to the message groups to the display unit 140. Here, the display items may be output to the current screen by default or output to the display unit 140 upon a request, such as scrolling, according to user settings. The conversation function application 151 may split a selected message group, merge message groups, move message groups, rearrange message groups, and the like according to input signals. The conversation function application 151 may output a quick view screen or a detailed view screen during a search of message groups.

The conversation information database 153 stores various messages and message groups generated in conversations. The conversation information database 153 stores information on display items associated with message groups, information on segmentation of a message group, information on merging of message groups, information on searching of message groups, and the like. Display items associated with message groups are described in more detail later with reference to the drawings.

The control unit 160 controls the supply of power to the components of the mobile terminal 100. For example, the control unit 160 controls the supply of power for initialization of the mobile terminal 100. The control unit 160 controls various signal flows between the components to support the message-based conversation function.

Figure 2:
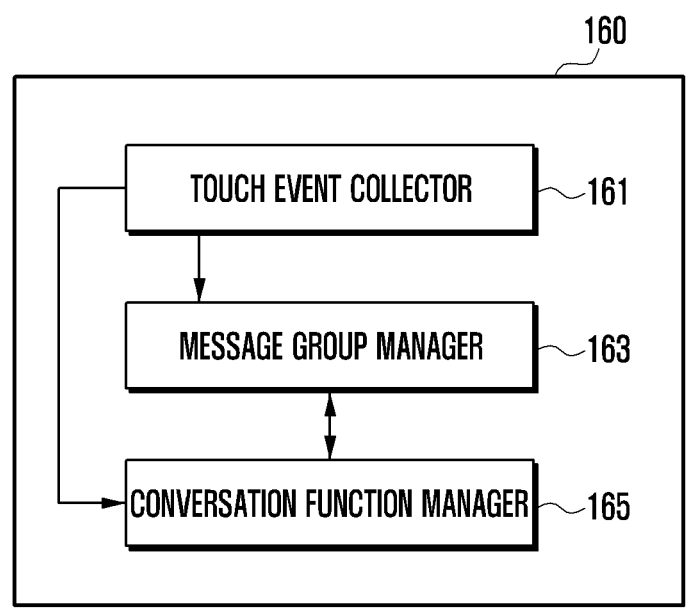
FIG. 2 illustrates an exemplary configuration of a control unit of the mobile terminal in FIG. 1.

FIG. 2 illustrates an exemplary configuration of a control unit of the mobile terminal in FIG. 1.

Referring to FIG. 2, the control unit 160 may include a touch event collector 161, a message group manager 163, and a conversation function manager 165.

The touch event collector 161 collects touch events generated by the touch panel 143 of the display unit 140. For example, the touch event collector 161 collects a touch event generated by the touch panel 143 after activation of the message-based conversation function. When a touch event is collected, the touch event collector 161 may send information on the type and coordinates of the touch event to the message group manager 163. In this process, the touch event collector 161 may configure touch regions on the touch panel 143. For example, when a message group is created, a display item corresponding to the message group may be displayed on the display panel 141 and the touch event collector 161 may configure a touch region on the touch panel 143 so that the user may select the display item by touching the touch region.

The message group manager 163 supports creation, display, management, searching, and the like of message groups. Under control of the conversation function manager 165, the message group manager 163 may classify enrolled messages according to a preset condition or user input to thereby generate message groups. The message group manager 163 may create display items corresponding to the message groups and output the display items to the display panel 141 according to user selection. Here, a display item may be of a fast view type or an icon type. A display item of the fast view type shows portions of messages present in the corresponding message group. A display item of the icon type shows information derived from messages present in the corresponding message group or information entered by the user.

The message group manager 163 may split a message group, merge message groups, and move or rearrange display items on the display panel 141 according to user input. When a display item is selected, the message group manager 163 may output a quick view screen or a detailed view screen, which shows a message group associated with the selected display item, to the display panel 141. Manipulation of message groups by the message group manager 163 is described in more detail later with reference to the drawings.

The conversation function manager 165 invokes the conversation function application 151 stored in the storage unit 150 for execution in response to an input signal for activating a message-based conversation, retrieves requested information from the conversation information database 153, and outputs the retrieved information to the display unit 140. For example, when the conversation function is selected for activation, the conversation function manager 165 controls the display unit 140 to output a message composer. When a message is written, the conversation function manager 165 may send the written message to a mobile terminal of a selected counterpart. When a conversation counterpart is selected, the conversation function manager 165 may output messages, which are most recently sent to and most recently received from the selected counterpart, to the display unit 140. When the most recently exchanged messages are grouped into a message group, the conversation function manager 165 may output a display item corresponding to the message group to the display unit 140.

The conversation function manager 165 may display a message received from another mobile terminal on the display panel 141 and store the received message in the conversation information database 153. The conversation function manager 165 manages transmission and reception of messages in a message-based conversation, and supports the message group manager 163 to classify sent and received messages into message groups and to display, search and manage the message groups.

The conversation function manager 165 may initiate a new message-based conversation on the basis of an already stored message group under the direction of the message group manager 163. That is, the conversation function manager 165 sends a selected message group to a different mobile terminal of a specified counterpart so as to share the message group, displays newly sent and received messages after messages present in the shared message group, and stores the newly sent and received messages. Here, the conversation function manager 165 may send a message group to a counterpart mobile terminal only when the message group is not present in the counterpart mobile terminal. For example, the conversation function manager 165 may compare the user ID such as an address recorded in the message group with that of a user with whom a new conversation is to be initiated. When they are identical, the conversation function manager 165 determines whether the message group to be shared is present in the mobile terminal of the user with whom a new conversation is to be initiated. Here, a message group is assumed to have a unique identifier for identification. When a message group having an identifier identical to that of the message group to be shared is present in the mobile terminal of the user with whom a new conversation is to be initiated, the conversation function manager 165 may determine that the message group to be shared is present in the mobile terminal of the user with whom a new conversation is to be initiated, and skip transmission of the message group to be shared. When a terminal ID recorded in the message group to be shared is not identical to that of the counterpart user, or when the message group to be shared is not present in the mobile terminal of the counterpart user, the conversation function manager 165 may send the message group to be shared to the counterpart mobile terminal. The conversation function manager 165 may also send a message group to be shared to a mobile terminal of a user wishing to join the current conversation. In response to a request for a message group from a different mobile terminal, the conversation function manager 165 may send a requested message group to the different mobile terminal. To achieve this, the conversation function manager 165 may assign a unique identifier to a message group at the creation time. Unique identifiers of message groups may be shared between users participating in the same conversation.

As described above, the mobile terminal 100 supporting the message-based conversation function classifies many messages generated during a conversation into message groups according to preset conditions, enabling the user to search, manage and display the message groups with ease. In addition, the mobile terminal 100 may initiate a new conversation on the basis of already existing message groups.

Figure 3:
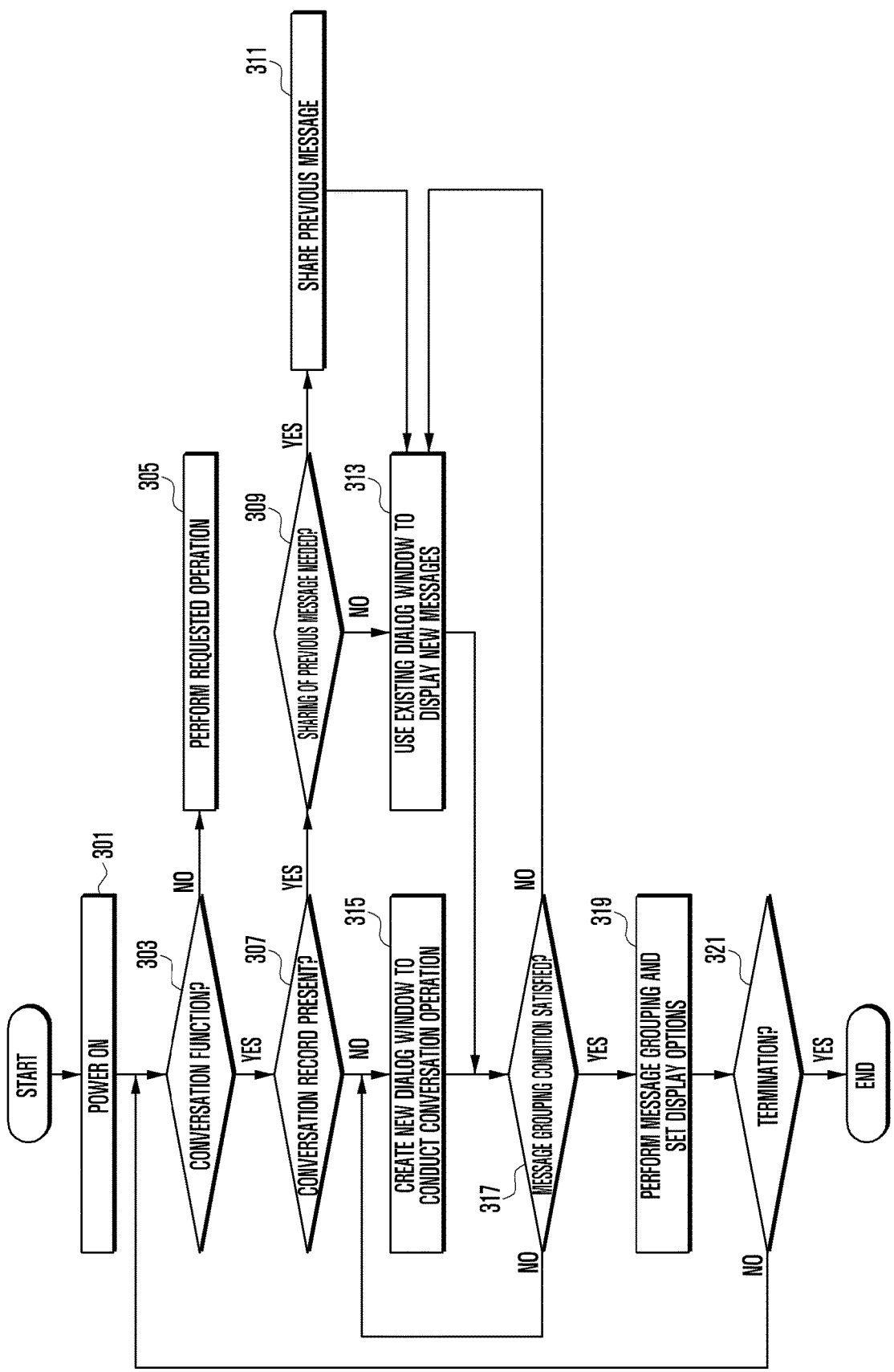
FIG. 3 is a flowchart of a conversation operation method according to an exemplary embodiment of the present invention.

FIG. 3 is a flowchart of a conversation operation method according to an exemplary embodiment of the present invention.

Referring to FIG. 3, the control unit 160 controls the supply of power to the components of the mobile terminal 100 at step 301. With the supply of power, the mobile terminal 100 enters into a ready state.

The control unit 160 determines whether an input signal for the conversation function is generated at step 303. When the generated input signal is not for the conversation function, the control unit 160 performs an operation indicated by the input signal at step 305. For example, the control unit 160 may perform call handling, broadcast reception, file playback, file search, audio sound generation, game application execution, and the like.

When an input signal for the conversation function is generated, the control unit 160 determines whether a conversation record related to the input signal is present at step 307. Here, the input signal for the conversation function may correspond to activation of the conversation function application 151 or to reception of a message related to a conversation. When messages are exchanged during a conversation, the control unit 160 may collect a counterpart user ID, conversation ID and terminal address from the messages as conversation records. Hence, when a counterpart user is given, the control unit 160 may determine whether a conversation record related to the counterpart user is present. To achieve this, the mobile terminal 100 stores messages exchanged during a conversation by default, and stores the counterpart user ID, conversation ID and terminal address as index information. In this case, the presence of a conversation record related to a counterpart user may be determined when the user selects a counterpart user ID, conversation ID or terminal address.

When a conversation record is present, the control unit 160 determines whether sharing of a previous message or message group is necessary at step 309. When sharing of a previous message or message group is necessary, the control unit 160 sends a message or message group to be shared to a counterpart mobile terminal at step 311. That is, as described before, when a message or message group to be shared is not present in a counterpart mobile terminal, the control unit 160 transmits the message or message group to be shared to the counterpart mobile terminal.

When sharing of a previous message or message group is not necessary, the control unit 160 uses an existing dialog window to display new messages at step 313. That is, when the previous message or message group is already distributed among participants or is not needed, the control unit 160 displays a new message immediately after the previous message in an existing dialog window.

When a conversation record is not present (for example, conversation with a new counterpart or new conversation with an existing counterpart), the control unit 160 generates a new dialog window and conducts a conversation operation using the new dialog window at step 315. That is, the control unit 160 displays a message received through the communication unit 110 on the display panel 141, stores the received message in the storage unit 150, and sends a written message to the counterpart mobile terminal.

The control unit 160 determines whether a message grouping condition is satisfied during the conversation at step 317. Here, a message grouping condition may be satisfied, for example, when a preset time expires without message exchange in the current conversation or when a termination request for the current conversation is issued. Message grouping conditions may be automatically or manually triggered by various events.

Automatic message grouping conditions may correspond to expiration of a preset time without message exchange in a conversation, a change of the date during a conversation, generation of an input signal for terminating the conversation, expiration of a preset period or exchange of a preset number of messages during a conversation, and a preset number of appearances of words or phrases such as "bye", "end", "termination", and the like in a conversation. Two or more of such message grouping conditions may be simultaneously triggered. In message grouping conditions, specific time duration, number, amount, date, phrase, or the like may be adjusted by the user. Manual message grouping conditions may correspond to an input signal for a message grouping request and an input signal for grouping a set of selected messages.

When a message grouping condition is satisfied, the control unit 160 classifies exchanged messages into message groups and sets display options at step 319. Here, the message groups are stored in the conversation information database 153. The control unit 160 may create display items corresponding to the message groups and display the display items on the display panel 141.

Thereafter, the control unit 160 determines whether an input signal for ending the conversation is input at step 321. When an input signal for ending the conversation is not input, the control unit 160 returns to step 315 or step 313 depending upon use of the new or existing dialog window.

As described above, the exemplary message-based conversation operation method may generate message groups on the basis of messages exchanged during a conversation. The method may initiate a new conversation using an existing message or message group.

Figure 4:
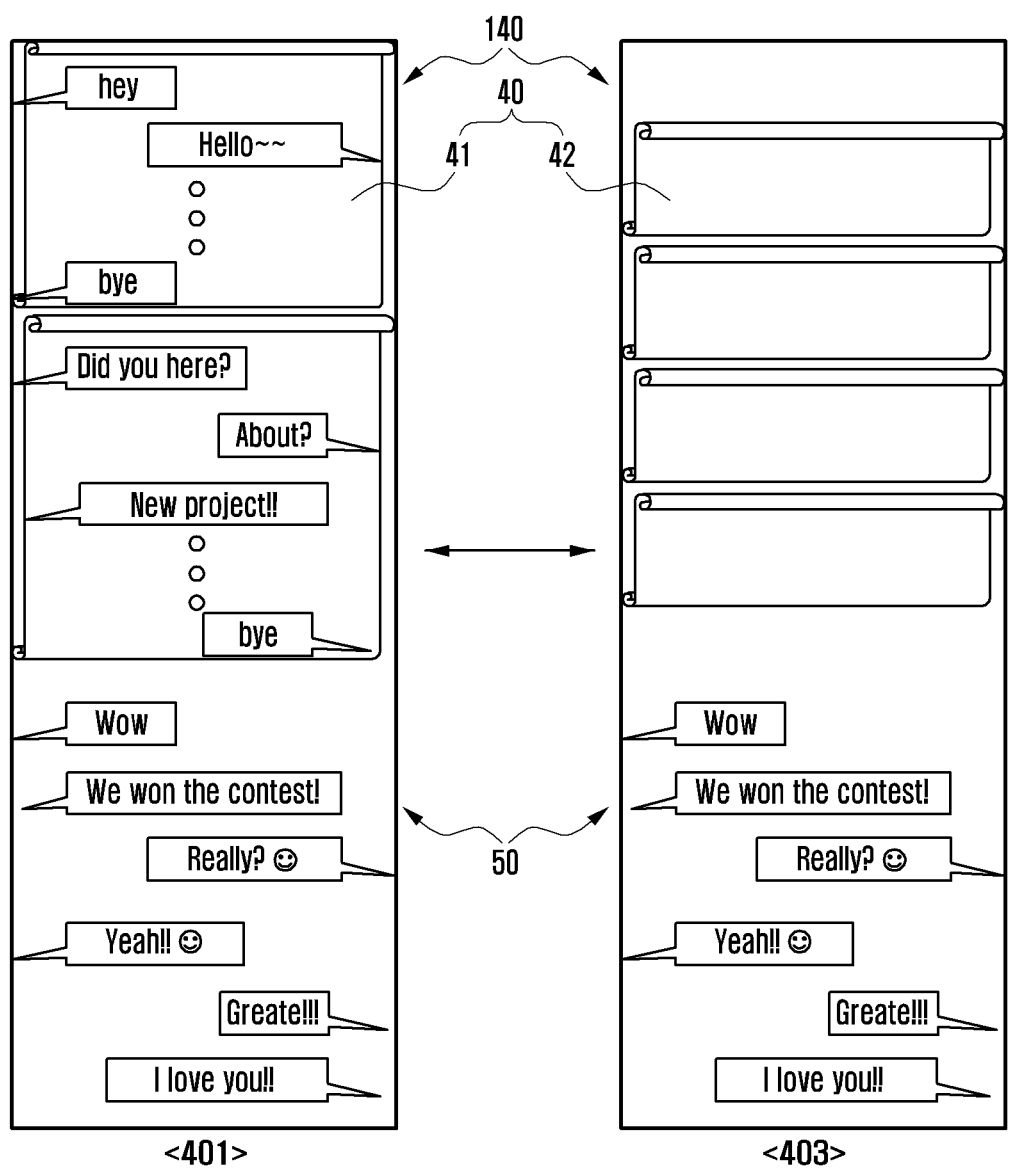
FIG. 4 illustrates screen representations of individual messages and message groups in conversations according to an exemplary embodiment of the present invention.

FIG. 4 illustrates screen representations of individual messages and message groups in conversations according to an exemplary embodiment of the present invention.

Referring to FIG. 4, in response to an input signal for activating the conversation function application 151, the mobile terminal 100 may display a conversation history screen as shown by screen 401. To be more specific, when an input signal for selecting the conversation function application 151 is generated or a message for a conversation is received, the mobile terminal 100 activates the conversation function application 151. Here, the mobile terminal 100 determines whether a conversation record is present on the basis of a terminal address of a counterpart user selected by the user or a terminal address contained in a received message. When a conversation record is present, the mobile terminal 100 displays a dialog window containing a conversation history on the display unit 140 as shown by screen 401. Here, display items 41 (of quick view type) corresponding to message groups need not be displayed by default but may be displayed on the display unit 140 according to user selection (for example, scroll event). A display item 41 of quick view type may show portions of messages contained in the corresponding message group within a preset region.

As shown by screen 403, a message group may be output as a display item 42 of icon type. A display item 42 of icon type does not show messages contained in the corresponding message group. A display item 42 of icon type may show the creation date of the corresponding message group or specific information such as tag information given to the corresponding message group.

An input signal may cause a transition between screen 403 and screen 401. That is, when the user generates a specific event in a state where screen 401 is output, the control unit 160 may change display items 41 of quick view type into display items 42 of icon type. When the user generates a specific event in a state in which screen 403 is output, the control unit 160 may change display items 42 of icon type into display items 41 of quick view type. As described before, display items 40 need not be displayed by default, and may be displayed on the display unit 140 only when a specific event, such as scrolling, is generated. Among display items 40, those display items 40 corresponding to recently created message groups may be displayed together with ungrouped messages. Here, messages 50 arranged below display items 40 corresponding to message groups may be ungrouped (or unclassified). That is, some messages may be ungrouped when a manual message grouping condition is configured, when an automatic message grouping condition is not satisfied, or when a special user request is issued. Display items 40 and messages 50 may be alternately placed when they are arranged in order of time.

Figure 5:
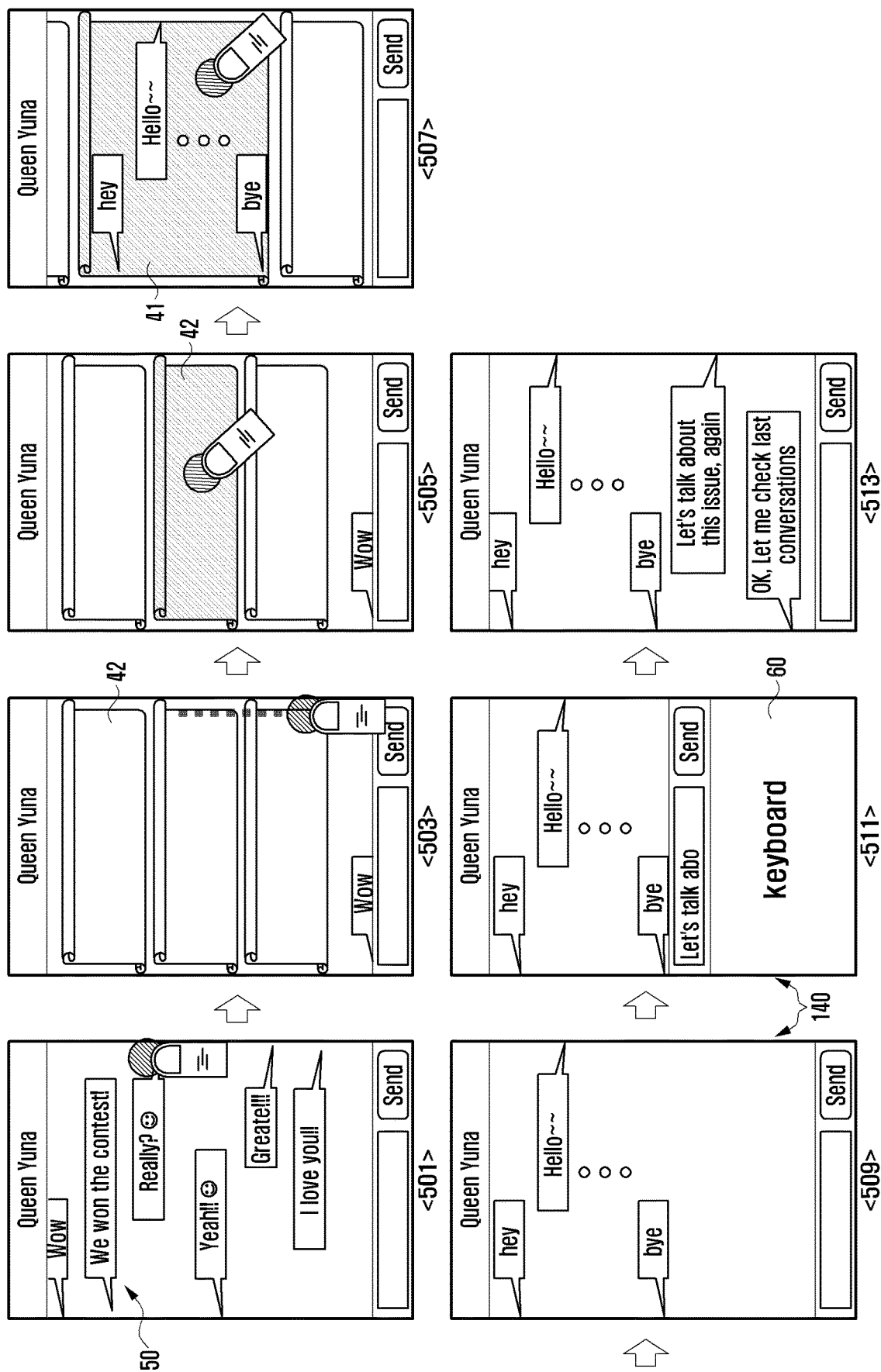
FIG. 5 illustrates screen representations for an ongoing conversation with manipulation of message groups according to an exemplary embodiment of the present invention.

FIG. 5 illustrates screen representations for an ongoing conversation with manipulation of message groups according to an exemplary embodiment of the present invention.

Referring to FIG. 5, in response to an input signal for the conversation function, the control unit 160 of the mobile terminal 100 executes the conversation function application 151 and displays a corresponding application screen as shown by screen 501. Here, the control unit 160 determines whether a conversation record is present on the basis of a counterpart user selected by the user, conversation identifier or a counterpart terminal address. When a conversation record is present, the control unit 160 displays previous messages 50 on the display unit 140 as shown by screen 501. When a pertinent conversation record is not present, the control unit 160 outputs a new dialog window and displays exchanged messages 50 in the new dialog window as shown by screen 501.

When the user may generate a scroll event to find a message group related to the current counterpart user, the control unit 160 outputs display items 42 of icon type corresponding to hidden message groups on the display unit 140 as shown by screen 503. Other gesture-related events may also be used to find a message group. For example, when the user makes a long press on a specific portion of screen 501, display items 42 of icon type may be output on the current screen as shown by screen 503. When all message groups related to a given counterpart mobile terminal are already output as display items 42 of icon type, the control unit 160 may ignore an additional scroll event by keeping display status constant. Here, the control unit 160 may output an alert phrase "no more message groups".

In a state in which one or more display items 42 of icon type are output as shown by screen 503, the user may select one display item 42 to identify contents of a message group corresponding to the selected display item 42. For example, when the user generates an input signal for selecting one display item 42 of icon type as shown by screen 505, the control unit 160 may output a display item 41 of quick view type as shown by screen 507. A display item of quick view type may show portions of messages contained in the corresponding message group within a screen region. Through a display item of quick view type, the user may easily identify contents of the corresponding message group.

When the user generates an event for the conversation function in the display item 41 of quick view type as shown by screen 507, the control unit 160 may open a new dialog window in a full screen format using messages in the message group corresponding to the display item 41 as shown by screen 509 or in a small screen format using only messages currently appearing in the display item 41 of quick view type. That is, the control unit 160 may open a new dialog window of a smaller size with messages appearing in the display item 41 of quick view type or open a new dialog window of a larger size with a larger number of messages belonging to the message group corresponding to the display item 41.

In response to a user request, the control unit 160 may output a message composer 60 at a region of the display unit 140 as shown by screen 511. The control unit 160 may display a message written using the message composer 60 and a message received from the counterpart mobile terminal immediately below messages of the previous conversation as shown by screen 513. Hence, the mobile terminal 100 may initiate a new conversation in succession to the previous conversation.

In the case of receiving a message from another mobile terminal as a request for initiating a new conversation in succession to a previous conversation, the control unit 160 may output the received message immediately below messages in a message group of the previous conversation. To be more specific, when a request for initiating a new conversation and message group information are received from a counterpart mobile terminal, the control unit 160 determines whether a message group of a previous conversation indicated by the received message group information is stored.

When an indicated message group is stored, the control unit 160 displays messages in the indicated message group on the display unit 140 and displays newly exchanged messages immediately after the messages in the indicated message group.

When an indicated message group is not stored, the control unit 160 may send a request for the indicated message group to the counterpart mobile terminal automatically or according to user selection. When the indicated message group is received from the counterpart mobile terminal, the control unit 160 may store the received message group, display messages in the received message group on the display unit 140, and display newly exchanged messages immediately after the messages in the received message group. Hence, the mobile terminal 100 may initiate a new conversation using messages of the previous conversation.

In one conversation, message grouping conditions may be different between counterpart mobile terminals. However, automatic message grouping conditions based on date or time may produce the same message groups for counterpart mobile terminals. Hence, to initiate a new conversation using a message group of the previous conversation, it is necessary to determine whether the message group is shared between participants. When the message group to be shared is already present, the user may control the mobile terminal 100 to skip sending a message group request.

Figure 6:
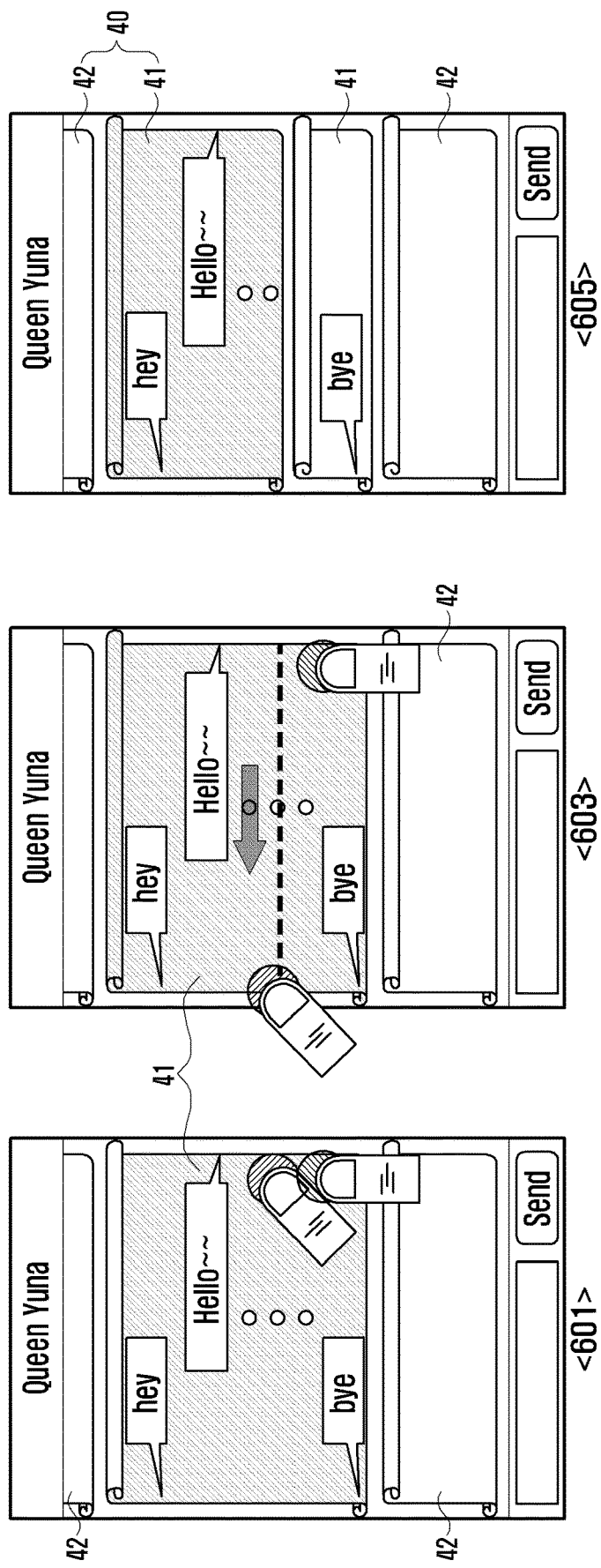
FIG. 6 illustrates screen representations for splitting a message group according to an exemplary embodiment of the present invention.

FIG. 6 illustrates screen representations for splitting a message group according to an exemplary embodiment of the present invention.

Referring to FIG. 6, in response to a user request, the control unit 160 of the mobile terminal 100 may output one or more display items 42 of icon type corresponding to message groups on the display unit 140. When the user selects one of the display items 42 of icon type as a quick view request, the control unit 160 may change the selected display item 42 of icon type into a display item 41 of quick view type, which shows portions of messages contained in the corresponding message group, as shown by screen 601. As described before, in response to a quick view request, the control unit 160 may show portions of messages contained in a corresponding message group within a screen region. The control unit 160 may provide a scroll function to the display item 41 of quick view type so that all messages contained in the corresponding message group can be viewed. In the present invention, the screen region allocated to a display item 41 of quick view type may be adjusted according to situations. For example, when a large number of messages are contained in the corresponding message group, the screen region allocated to a display item 41 of quick view type may be increased, or the message display size may be reduced, so that a larger number of messages can be displayed. When the screen region allocated to a display item 41 of quick view type is not sufficient to accommodate all messages contained in the corresponding message group, the control unit 160 may provide a scroll function to the display item 41 so that all the messages can be viewed.

The user may issue a request for splitting a message group. For example, as shown by screen 601, the user may enter a first touch gesture at a portion of the display item 41 of quick view type and enter a second touch gesture at another portion thereof while maintaining the first touch gesture to split the message group corresponding to the display item 41. The control unit 160 may divide the corresponding message group on the basis of the touch gestures. For example, as shown by screen 603, when the second touch gesture is a drag action in a direction, the control unit 160 may divide the message group with respect to the drag action. Thereafter, the control unit 160 may output two display items 41 of quick view type corresponding to the two divided message groups as shown by screen 605. Here, the control unit 160 may recognize simultaneous occurrence of two touch gestures at different portions of a display item 41 of quick view type as activation of a message group splitting function, and identify the demarcation line between the two split message groups on the basis of the movement of the second touch gesture. Thereafter, the control unit 160 may generate two display items 41 of quick view type and associate the display items 41 respectively with the two split message groups.

In the above description, a message group is divided by entering multiple touch gestures and dragging. However, splitting of a message group may be performed in other ways. For example, when touch gestures for selecting one or more of the messages contained in a message group and binding the selected messages are entered, the control unit 160 may create one split message group containing the selected messages and create another split message group containing the remaining messages. Hence, the user may create a new message group by selecting messages having specific properties among messages contained in a given message group.

The control unit 160 may delete a display item 41 of quick view type corresponding to a message group in a state indicated by screen 605. That is, when the user selects a display item 40 and generates an input signal for deleting the selected display item 40, the control unit 160 may remove both the display item 40 and a message group associated with the display item 40.

Figure 7:
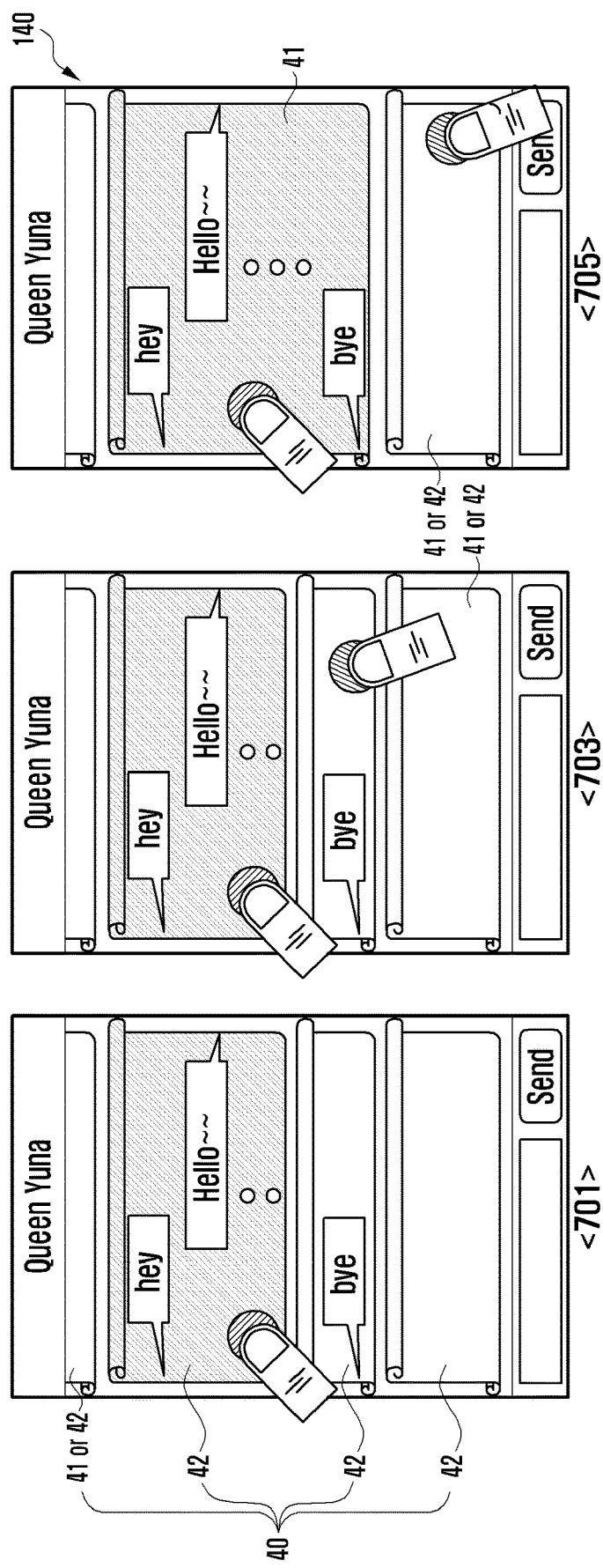
FIG. 7 illustrates screen representations for merging message groups according to an exemplary embodiment of the present invention.

FIG. 7 illustrates screen representations for merging message groups according to an exemplary embodiment of the present invention.

Referring to FIG. 7, in response to a user request, the control unit 160 may output multiple display items 40 corresponding to message groups on the display unit 140. For example, when multiple message groups are present for a given counterpart user, in response to a request for activating the conversation function, the control unit 160 may output multiple display items 40 corresponding to the message groups on the display unit 140 as shown by screen 701. Here, the display item 40 may be a display item 41 of quick view type or a display item 42 of icon type. According to user settings, the control unit 160 may output display items 41 of quick view type only or output a display item 41 of quick view type and a display item 42 of icon type in combination.

The user enters a touch gesture for selecting a display item 41 corresponding to a first message group to be merged as shown by screen 701. For example, when the user enters a long press gesture on the display unit 140 outputting display items 41 corresponding to message groups, the control unit 160 may recognize the gesture as a request for merging message groups. Here, the control unit 160 may highlight the selected message group or apply layering effects thereto so that the selected message group may be readily noticeable.

The user enters a touch gesture for selecting a display item 41 corresponding to a second message group to be merged as shown by screen 703. Here, the user may maintain the touch gesture selecting the first message group to be merged. When two display items are selected as shown by screen 703 or the two touch gestures are drawn closer together, the control unit 160 may merge the two message groups associated with the selected display items. Here, the control unit 160 may create a merger message group containing messages of the selected message groups in sequence. Thereafter, the control unit 160 may output a display item 41 of quick view type corresponding to the merger message group on the display unit 140 as shown by screen 705.

The user may merge more than two message groups. For example, the user may enter a long press gesture on a display item 41 associated with a first message group, and select display items 41 associated with message groups in sequence while maintaining the long press gesture. Then, the control unit 160 may merge the message groups by adding messages of the message groups selected in sequence to the first message group (the merger message group). Here, the messages in the merger message group may be arranged in order of selection of the merged message groups.

The user may restrict the size of a display item 41 associated with the merger message group on the display unit 140 to allow other display items 41 to be adequately output on the display unit 140. This enables selection of a display item 41 not associated with the merger message group without a scroll action. The control unit 160 may resize characters and images of the merger message group so that message contents of the merger message group can be displayed as much as possible in a restricted region.

The display item that is selected first for merging message groups may be a display item 41 of quick view type or a display item 42 of icon type. That is, the display item corresponding to the merger message group may be a display item 41 of quick view type or a display item 42 of icon type.

When a display item 41 of quick view type and a display item 42 of icon type are selected for merge operation, the control unit 160 may merge the corresponding message groups and output a display item 41 of quick view type together with some portion of information carried by the display item 42 of icon type, or the control unit 160 may merge the corresponding message groups and output a new display item 42 of icon type on the display unit 140.

When two display items 42 of icon type are selected for merge operation, the control unit 160 may merge the corresponding message groups, output a new display item 42 of icon type or leave only one of the two display items 42 of icon type, and output a display item 41 of quick view type after merging. That is, when two display items 42 of icon type are selected for merge operation, the control unit 160 may merge the corresponding message groups, remove the display items 42 of icon type from the display unit 140, and output a display item 41 of quick view type corresponding to the merger message group.

Figure 8:
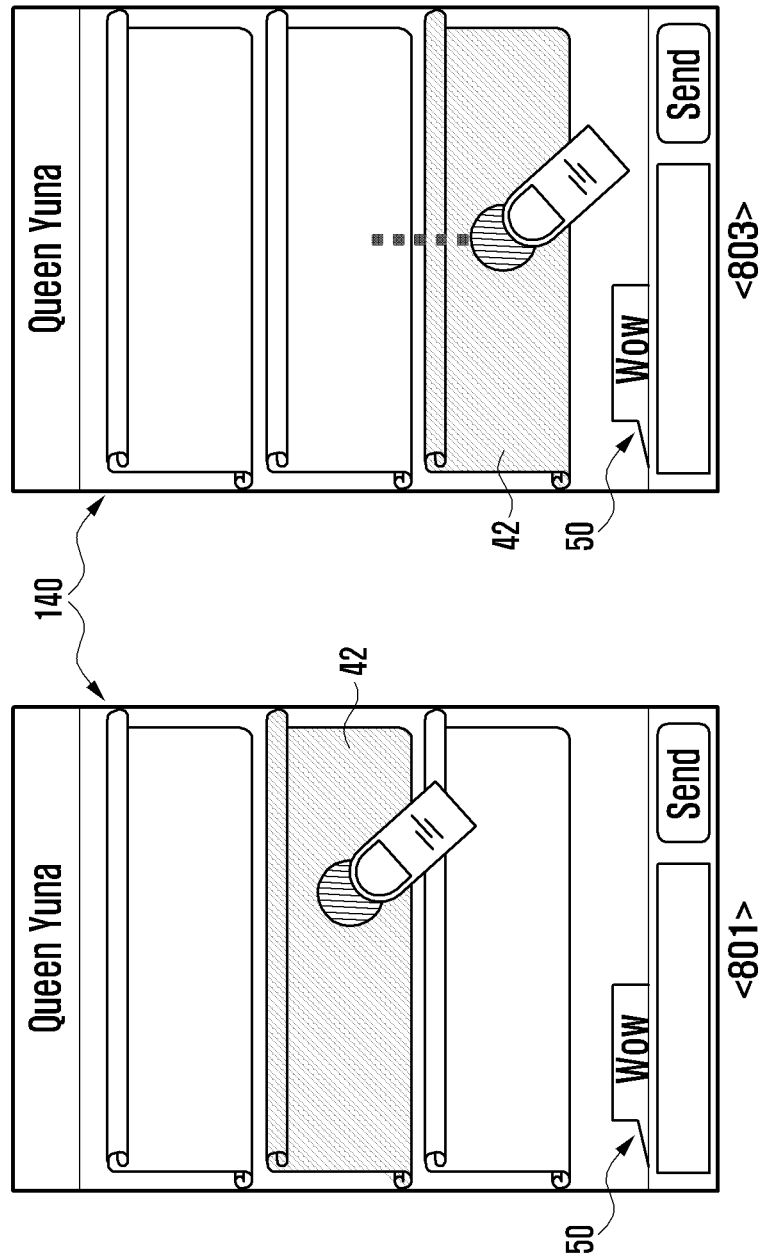
FIG. 8 illustrates screen representations for moving a message group according to an exemplary embodiment of the present invention.

FIG. 8 illustrates screen representations for moving a message group according to an exemplary embodiment of the present invention.

Referring to FIG. 8, in response to a user request, the control unit 160 may output one or more display items 42 of icon type corresponding to message groups on the display unit 140 as shown by screen 801. That is, in response to a user request after outputting a dialog window containing messages on the display unit 140, the control unit 160 may output display items 42 of icon type corresponding to message groups on the display unit 140. Here, the control unit 160 may also output a message 50 after the display items 42 according to availability of a display region. That is, the control unit 160 may place the display items 42 of icon type between existing messages 50 without allocating a separate page. To move a specific message group on the display unit 140, the user may enter a long press touch gesture to select a display item 42 of icon type associated with the message group to be moved.

Then, the control unit 160 may provide a visual effect to the selected display item 42 of icon type to indicate a selection for movement. For example, the control unit 160 may highlight the boundary of the selected display item 42 or impart layering effects thereto.

The user moves the selected display item 42 of icon type to a desired position by dragging and releasing the touch gesture as shown by screen 803. Then, the control unit 160 may change positions of display items 41 during movement of the selected display item 42 and place the selected display item 42 at a position where the touch gesture is released on the display unit 140. Such movement of a message group may also be performed between individual messages 50. For example, when a selected display item 42 of icon type is dragged below a message 50 on the display unit 140, the control unit 160 may place the selected display item 42 of icon type below the message 50. Here, the control unit 160 may move a second message 50, which is placed at the position to which the selected display item 42 is moved, to a nearby or preset position.

Figure 9:
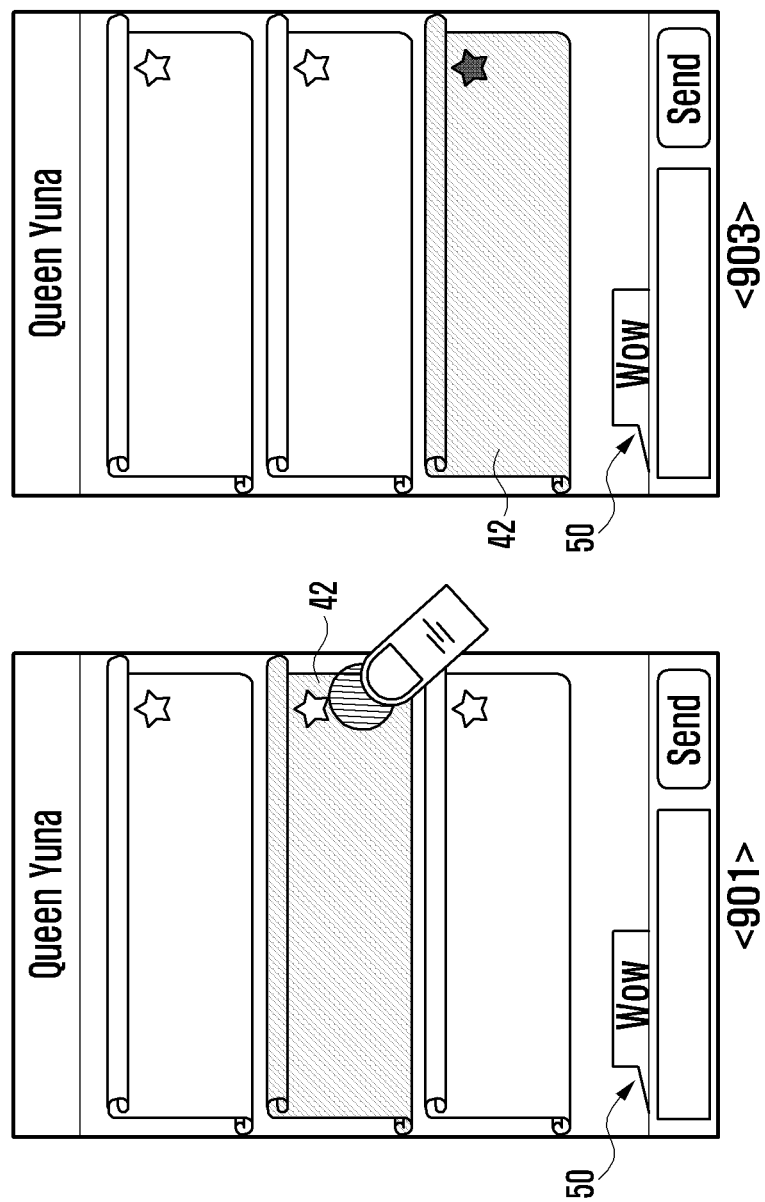
FIG. 9 illustrates screen representations for sorting message groups according to an exemplary embodiment of the present invention.

FIG. 9 illustrates screen representations for sorting message groups according to an exemplary embodiment of the present invention.

Referring to FIG. 9, in response to a user request, the control unit 160 may output one or more display items 42 of icon type on the display unit 140 as shown by screen 901. That is, in response to a user request after outputting a dialog window containing messages on the display unit 140, the control unit 160 may output display items 42 of icon type corresponding to message groups on the display unit 140. More particularly, the control unit 160 may attach a priority indication to each display item 42 of icon type. To achieve this, the control unit 160 may provide a menu item for enabling the user to attach a priority indication to the corresponding display item 42 of icon type. For example, the control unit 160 may output a check option like an asterisk to each display item 42 of icon type as shown by screen 901. Then, the user may set the check option of a display item 42 of icon type to thereby assign a priority indication to a message group corresponding to the display item 42.

When the check option of a display item 42 of icon type is set, the control unit 160 may assign a priority indication to a message group corresponding to the display item 42 and update the message group information stored in the conversation information database 153. In addition, the control unit 160 may move the display item 42 of icon type whose check option is set to a position close to the most recent message, so that the user can readily identify the message group corresponding to the display item 42 as shown by screen 903. Hence, the user may view display items 42 of icon type corresponding to important message groups first by entering a scroll gesture on the current screen.

The control unit 160 may treat a newly created display item 42 of icon type as important by placing the newly created display item 42 at a position close to the most recent message 50. However, a display item 42 of icon type whose check option is set may be placed at a position closer to the most recent message 50 than a newly created display item 42 of icon type.

In FIGS. 8 and 9, movement and sorting of display items are described using display items 42 of icon type. However, the same description may be applied to display items 41 of quick view type. That is, on the display unit 140, a display item 41 of quick view type may be selected and moved to another position, or may be given a priority indication for sorting. For priority assignment, a check option may be attached to a portion of each display item 41 of quick view type.

Figure 10:
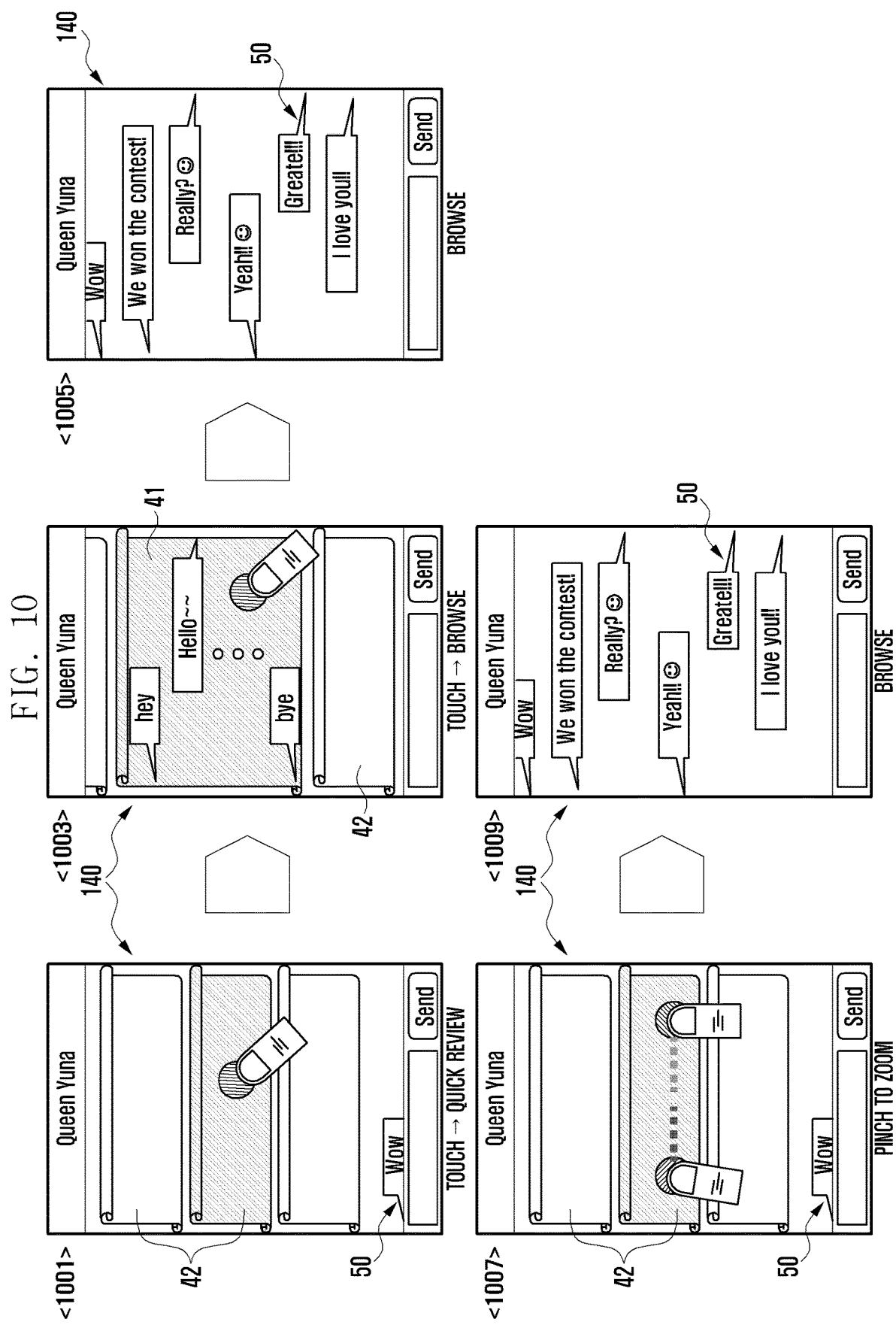
FIG. 10 illustrates screen representations for searching or browsing message groups according to an exemplary embodiment of the present invention.

FIG. 10 illustrates screen representations for searching or browsing message groups according to an exemplary embodiment of the present invention.

Referring to FIG. 10, in response to a user request, the control unit 160 may output one or more display items 42 of icon type corresponding to message groups on the display unit 140 as shown by screen 1001. That is, in response to a user request like a scroll event after outputting a dialog window containing messages 50 on the display unit 140, the control unit 160 may output display items 42 of icon type on the display unit 140. When the user enters a touch gesture on one of the display items 42 of icon type as shown by screen 1001, the control unit 160 may change the touched display item 42 of icon type into a display item 41 of quick view type, which shows portions of messages contained in the corresponding message group within a preset region, as shown by screen 1003.

For example, when a tap event occurs at a display item 42 of icon type in screen 1001, the control unit 160 may change the tapped display item 42 of icon type into a display item 41 of quick view type as shown by screen 1003. The display item 41 of quick view type shows portions of messages contained in the corresponding message group within a preset region. In this process, the control unit 160 may rearrange display items on the display unit 140 to allocate a wider display region to the display item 41 of quick view type. For example, the control unit 160 may shift the untapped display items 42 of icon type away from the tapped display item 42 of icon type to be changed on the display unit 140.

When the user enters a touch gesture on the display item 41 of quick view type as shown by screen 1003, the control unit 160 may enlarge the display item 41 of quick view type in a full screen format as shown by screen 1005. That is, the control unit 160 displays messages 50 contained in a message group corresponding to the touched display item 41 of quick view type on the full screen of the display unit 140.

In the above description, output of a display item of quick view type and full screen display of a message group are performed in sequence. However, the present invention is not limited thereto. For example, as shown by screen 1007 and screen 1009, when a particular event occurs at a display item 42 of icon type, the control unit 160 may directly display messages contained in a message group corresponding to the display item 42 of icon type in a full screen format without outputting a display item 41 of quick view type. That is, when the user generates a preset event such as a pinch-zoom event on one of multiple display items 42 of icon type as shown by screen 1007, the control unit 160 may output messages contained in a message group corresponding to the selected display item 42 of icon type in a full screen format as shown by screen 1009.

In addition, the control unit 160 may return from the full screen (screen 1005 or screen 1009) to the original screen (screen 1001 or screen 1007) differently depending upon touch gestures. For example, when a touch event like tap for the previous screen occurs at screen 1005, the control unit 160 may restore screen 1003. When a touch event like pinch-zoom for the original screen occurs at screen 1009 (or screen 1005), the control unit 160 may directly restore screen 1007 (or screen 1001).

Figure 11:
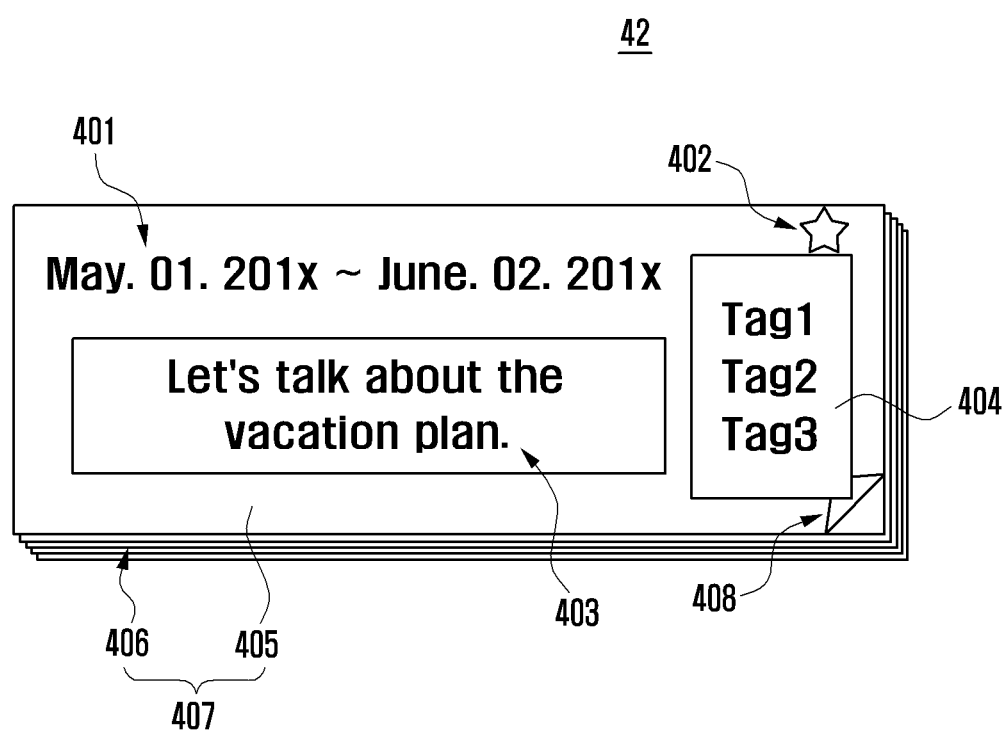
FIG. 11 illustrates a display item of icon type in a first form for depicting message group information according to an exemplary embodiment of the present invention.

FIG. 11 illustrates a display item of icon type in a first form for depicting message group information according to an exemplary embodiment of the present invention.

Referring to FIG. 11, a message group may be represented by a display item 42 of icon type with a given size, which can be output on the display unit 140. The display item 42 of icon type may include a time region 401, a priority region 402, a subject region 403, a tag region 404, and a margin region 407.

The time region 401 is used to record a time duration during which messages in the message group are exchanged. The control unit 160 examines date and time values of exchanged messages when a message group containing the messages is created as a result of message grouping, and records the identified time duration in the time region 401 of the corresponding display item 42 of icon type.

The priority region 402 is used to record a priority value assigned to the message group. The priority value recorded in the priority region 402 may be changed by the user. The control unit 160 may change the priority of the corresponding message group in response to a touch event occurring in the priority region 402. Here, the priority of a message group may be given in two or more levels. The priority region 402 may be displayed differently in shape, image, icon, text, color or brightness according to priority level.

The subject region 403 is used to record information describing the messages in the message group. Such descriptive information should be readily understandable to the user. To describe the message, the control unit 160 may automatically extract a portion of the longest message in the message group and write the extracted message portion to the subject region 403. Alternatively, the control unit 160 may automatically extract a portion of a message that contains the largest number of words frequently used in the messages of the message group and write the extracted message portion to the subject region 403. Such an automatic approach may extract portions of messages in the message group according to preconfigured settings or synthesize a short sentence summarizing messages in the message group using a contextual analysis technique. Here, the mobile terminal 100 may store an algorithm and database supporting discourse analysis or connect to a server providing a discourse analysis service. Alternatively, the user may directly write desired information to the subject region 403. To achieve this, when the message group is created, the control unit 160 may provide a window enabling the user to enter information to be written to the subject region 403. Furthermore, the control unit 160 may insert a value indicating the number of messages in the message group into the subject region 403 for better understanding of the message group.

The tag region 404 is used to provide tag information composed of meaningful words frequently used in the messages of the message group. The control unit 160 may analyze messages of the message group to extract frequently occurring meaningful words, and record the extracted meaningful words in order of occurrences in the tag region 404. Here, the most frequently used word is listed as a tag at the top portion of the tag region 404. The control unit 160 may record only words whose number of occurrences exceeds a threshold value as tags in the tag region 404.

The margin region 407 may be a region excluding the time region 401, priority region 402, subject region 403, and tag region 404. The margin region 407 may be divided into a background region 405 and a side region 406. The background region 405 is used to represent various colors and textural properties according to importance of the message group or user settings. The color of the background region 405 may be changed according to the importance or priority of the message group in terms of the number of views or searches. The mapping between colors and importance levels may be configured by the designer in advance or by the user.

The side region 406 may have a thickness indicating the number of messages in the message group. The layers at the side region 406 may indicate the number of stacked message groups in a conversation. When messages in a conversation are classified by a message grouping condition into message groups, the message groups may have different sizes. Hence, when a message group contains a small number of messages, the side region 406 is thin. And, when a message group contains a large number of messages, the side region 406 is thick. That is, the thickness of the side region 406 may vary depending upon the number of messages in the corresponding message group.

Display items 42 of icon type may be individually displayed on the display unit 140. However, when there are a large number of message groups in a conversation, the display region of the display unit 140 may be insufficient to individually present display items 42 of icon type. In this case, as shown in FIG. 11, multiple display items 42 of icon type may be stacked on the display unit 140, and the side region 406 may indicate this. By entering a touch gesture like a flick on a display item 42 of icon type, the user may view another display item 42 of icon type placed below the touched display item 42.

The margin region 407 may include an earmark region 408 at a corner. The earmark region 408 may indicate that another display item is present below the current display item 42 of icon type and the current display item 42 may be turned over. By entering a touch gesture on the earmark region 408, the user may hide the current display item 42 of icon type from the screen and view another display item 42 of icon type. Here, the hidden display item 42 of icon type may be placed at the bottom of the stacked display items 42.

The earmark region 408 formed at a corner may be used to browse messages contained in the message group corresponding to the current display item 42 of icon type. That is, when the user invokes a page turning function by entering a touch gesture on the earmark region 408, the control unit 160 may output a quick view screen of a page containing a number of messages in the corresponding message group. To view the remaining messages of the message group, the user may enter a touch gesture on the earmark region 408 in succession. For example, it may be assumed that a message group is composed of the following messages.

| Sequence | Speaker (sender) | Message |
| --- | --- | --- |
| 1 | A | Hi |
| 2 | B | Hi |
| 3 | A | How are you? |
| 4 | B | I'm fine, thanks. |
| 5 | A | I'm getting married soon. |
| 6 | B | Congratulations! |
| 7 | A | Shall we meet for dinner before the wedding day? |
| 8 | B | Ok. When? |
| 9 | A | The day after tomorrow at 6:30 PM. |
| 10 | B | All right. See you then. |

Whenever the user invokes a page turning function in the display item 42 of icon type, a quick view screen of a page containing, for example, the next three messages may be output on the display unit 140. That is, four pages (first page containing the first to third messages, second page containing the fourth to sixth messages, third page containing the seventh to ninth messages, and fourth page containing the tenth message) may be displayed in sequence as a quick view screen.

Figure 12:
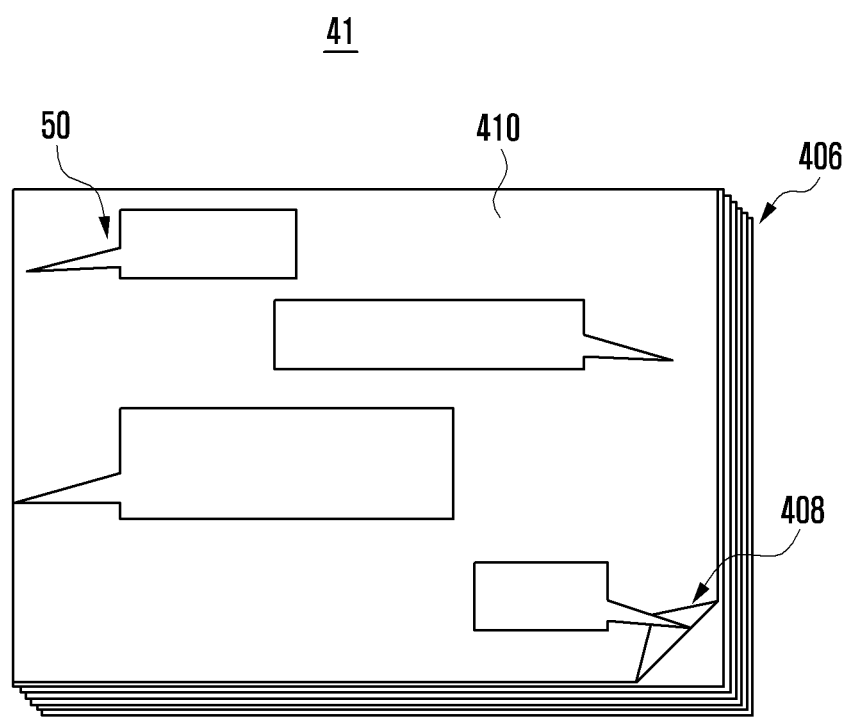
FIG. 12 illustrates a display item of quick view type in a first form for depicting message group information according to an exemplary embodiment of the present invention.

FIG. 12 illustrates a display item of quick view type in a first form for depicting message group information according to an exemplary embodiment of the present invention.

Referring to FIG. 12, in the mobile terminal 100, a message group may be represented by a display item 41 of quick view type. The display item 41 of quick view type includes a view region 410 in which a number of messages 50 contained in the message group are output. The layers at the side region 406 may indicate the number of stacked message groups in a conversation. The size of the view region 410 may be set in advance, and may be adjusted by the user. For example, the user may increase the size of the view region 410 by entering a touch gesture for expansion at an edge of the view region 410. When the size of the view region 410 is changed, the control unit 160 may adjust the number or display size of messages to be output.

Display items 42 of icon type (FIG. 11) and display items 41 of quick view type (FIG. 12) may be output together on the display unit 140. That is, some message groups in a conversation may be presented as display items 42 of icon type, and other message groups may be presented as display items 41 of quick view type. A display item may toggle between quick view type and icon type according to user selection. The mobile terminal 100 may output either display items 42 of icon type or display items 41 of quick view type by default, and may change default settings according to user selection.

To present a large number of message groups, display items 41 of quick view type may be stacked on the display unit 140. To view or browse stacked message groups, the display item 41 of quick view type may include an earmark region 408 at a corner. Use of the earmark region 408 for browsing stacked message groups is described later in connection with FIGS. 13 and 14.

Figure 13:
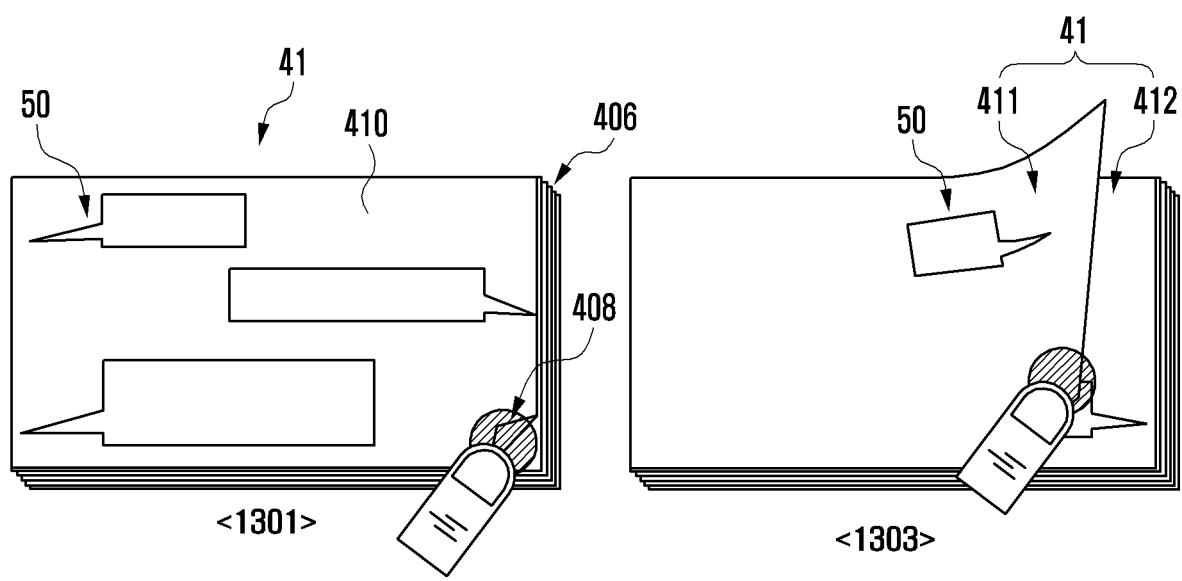
FIG. 13 illustrates screen representations for searching display items of message groups according to an exemplary embodiment of the present invention.

FIG. 13 illustrates screen representations for searching or browsing display items of quick view type according to an exemplary embodiment of the present invention.

Referring to FIG. 13, the control unit 160 may output a display item 41 of quick view type showing a number of messages contained in the message group. The display item 41 of quick view type may include a view region 410 and a side region 406. The view region 410 is used to output a number of messages. The side region 406 is used to indicate the number of message groups, and the thickness thereof is varied according to the number of message groups. As shown by screen 1301, to present multiple message groups, display items 41 of quick view type may be stacked on the display unit 140. To enable the user to search or browse stacked display items 41 of quick view type corresponding to multiple message groups, each display item 41 of quick view includes an earmark region 408 at a corner.

When display items 41 of quick view type are stacked on the display unit 140 as shown by screen 1301, the user may enter a touch gesture on a portion of the side region 406 to view another display item 41 of quick view type placed below the touched display item 41 of quick view type. That is, the user may enter a touch gesture like a drag or a flick on the earmark region 408 to turn over the topmost display item 411 of quick view type.

Then, the control unit 160 may turn over the topmost display item 411 of quick view type in a direction of the touch gesture, and output another display item 412 of quick view type placed below the topmost display item 411 of quick view type as shown by screen 1303. Here, the turnover speed of the topmost display item 411 of quick view type may be varied according to the movement speed and distance of the touch gesture. When the earmark region 408 of the topmost display item 411 of quick view type is moved more than a threshold distance, the control unit 160 may hide the topmost display item 411 of quick view type from the screen and output the next display item 412 of quick view type in full size. Here, the hidden display item 411 of quick view type may be placed at the bottom of the stacked display items 41.

Similarly, when the user touches some layers of the side region 406 and moves the side region 406 in a direction, the control unit 160 may move a corresponding number of display items 41 of quick view type in the direction of the touch gesture while bending the same and gradually output a display item 412 of quick view type placed below the moved display items 41. When the touch gesture is released, the control unit 160 may move the moved display items 41 of quick view type back to the original position on the display unit 140.

Figure 14:
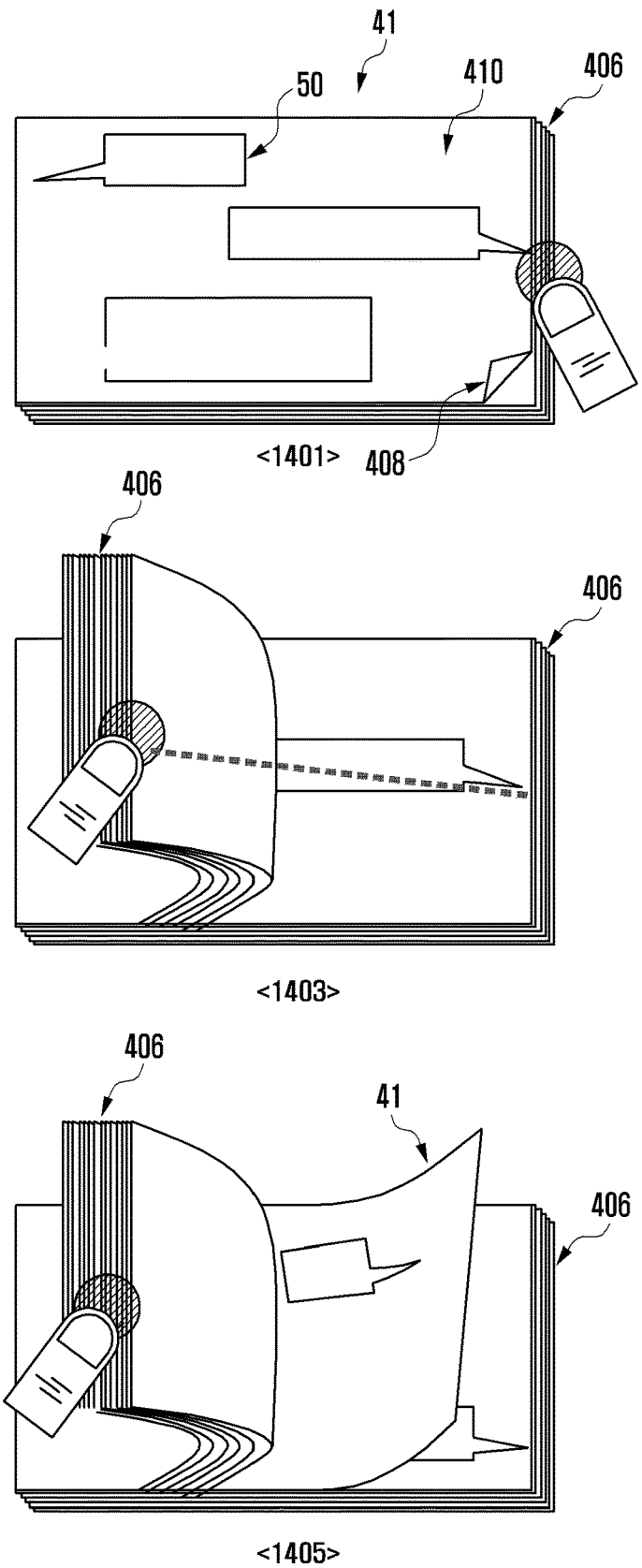
FIG. 14 illustrates additional screen representations for searching display items of message groups according to an exemplary embodiment of the present invention.

FIG. 14 illustrates additional screen representations for searching or browsing display items of quick view type according to an exemplary embodiment of the present invention.

Referring to FIG. 14, the control unit 160 may output a display item 41 of quick view type showing a number of messages contained in the message group as shown by screen 1401. The display item 41 of quick view type may include a view region 410 and a side region 406. The view region 410 is used to output a number of messages. The side region 406 is used to indicate a number of stacked message groups. The view region 410 includes an earmark region 408 at a corner. When the earmark region 408 is folded, this indicates the presence of another display item below the current display item. When the earmark region 408 is not folded, this indicates the absence of another display item below the current display item.

To rapidly browse the message groups, the user may enter a touch gesture at the side region 406 on the right as shown by screen 1401. The control unit 160 may recognize this touch gesture as a touch event for rapid browsing of the message groups.

When the user enters a drag gesture while touching the side region 406, the control unit 160 may move the side region 406 in a direction of the drag gesture while bending the touched display items 41 as shown by screen 1403. Here, the number of bent or moved display items 41 of quick view type may correspond to the number of touched layers of the side region 406 or to the touched thickness thereof. When the side region 406 is moved more than a threshold distance (for example, one third of the view region length), the control unit 160 may turn one or more of the bent display items 41 back to the original position (similar to page turning effects) as shown by screen 1405. Here, among the bent display items 41 of quick view type, the control unit 160 may turn over a display item 41 of quick view type that is released from the touch gesture (i.e., a display item having escaped from the area of the touch gesture) back to the original position. Hence, the user may slowly or rapidly browse the message groups by adjusting the speed of a touch and drag action on the display items 41 of quick view type.

In the above description, searching or browsing of message groups is performed using display items of quick view type. However, the present invention is not limited thereto. That is, searching or browsing of message groups may also be performed using display items of icon type. In other words, the description provided in relation to FIGS. 13 and 14 is applicable to the case of FIG. 11.

Figure 15:
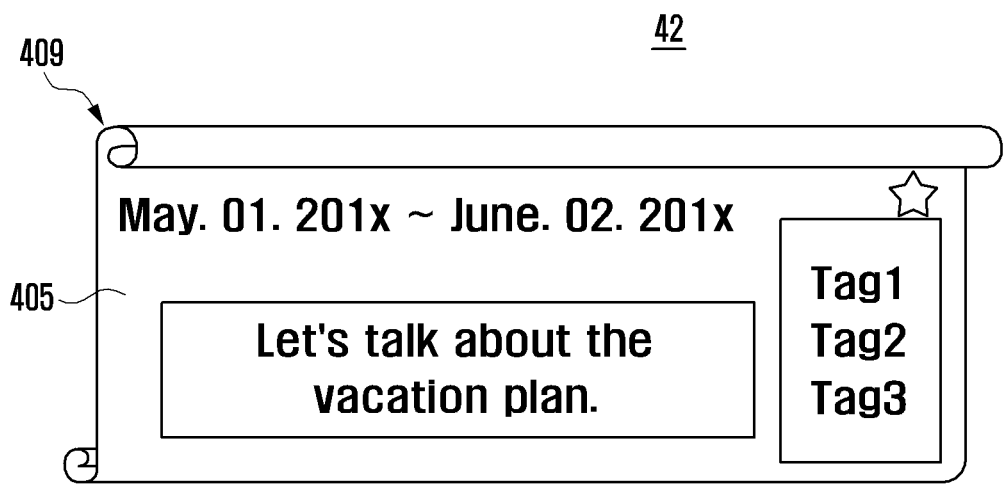
FIG. 15 illustrates a display item of icon type in a second form for depicting message group information according to an exemplary embodiment of the present invention.
Figure 16:
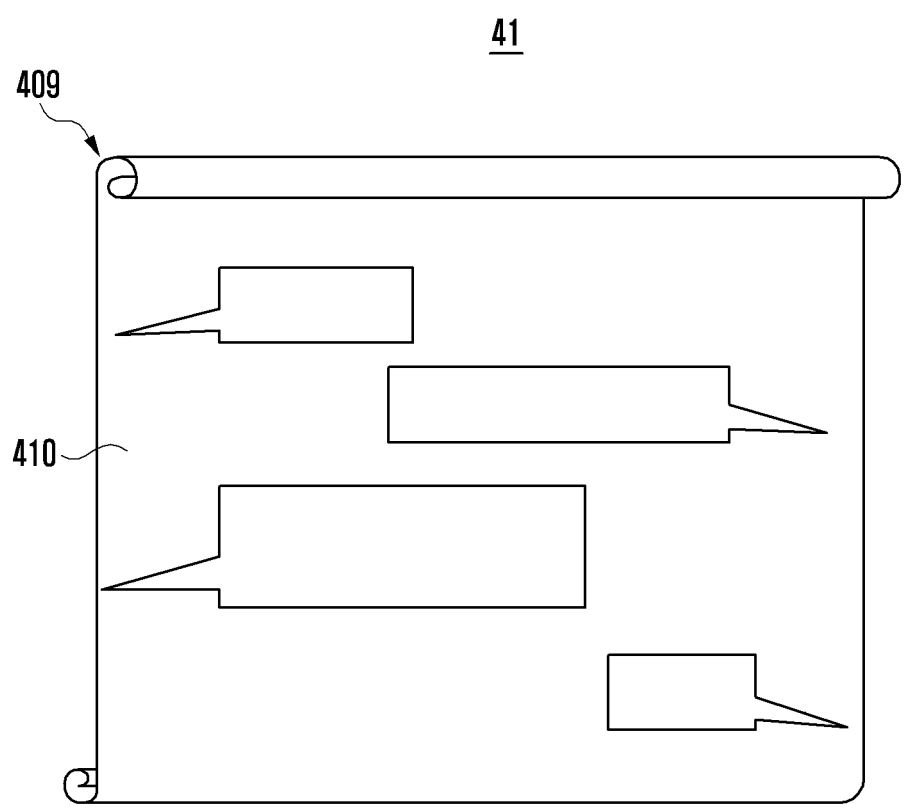
FIG. 16 illustrates a display item of quick view type in a second form for depicting message group information according to an exemplary embodiment of the present invention.

FIG. 15 illustrates a display item of icon type in a second form for depicting message group information according to an exemplary embodiment of the present invention. FIG. 16 illustrates a display item of quick view type in a second form for depicting message group information according to an exemplary embodiment of the present invention.

Referring to FIG. 15, the display item 42 of icon type corresponding to a message group includes a background region 405 and rolled-up regions 409. The background region 405 is the same as that shown in FIG. 11, and a description thereof is omitted.

The display item 42 of icon type may have an upper rolled-up region 409 at the upper boundary and a lower rolled-up region 409 at the lower boundary. Here, the upper rolled-up region 409 is rolled inwards, and the lower rolled-up region 409 is rolled outwards. The two rolled-up regions 409 may be rolled in the same direction.

The amount of rolling up of the rolled-up region 409 may indicate the number of messages in the corresponding message group. That is, when the corresponding message group contains a large number of messages, the rolled-up region 409 of the display item 42 of icon type may be rolled up many times or the display item 42 may become thick. Hence, the user may estimate the number of messages in the message group on the basis of the amount of rolling up of the rolled-up region 409.

Referring to FIG. 16, the display item 41 of quick view type representing a message group may include a view region 410 and a rolled-up region 409 at the boundary. The view region 410 is used to output a number of messages. As described before in relation to FIG. 15, the amount of rolling up of the rolled-up region 409 or the thickness thereof may indicate the number of messages in the corresponding message group.

When a scroll event occurs in the view region 410 of the display item 41 of quick view type, the control unit 160 may scroll messages up or down and roll the rolled-up region 409 in a direction. For example, when the user enters a scroll-up gesture on the view region 410, the control unit 160 may roll the rolled-up region 409 inwards and rearrange the messages accordingly. When a preset touch event occurs at the display item 41 of quick view type, the control unit 160 may display the display item 41 in a full screen format. In this case, the rolled-up region 409 may be hidden from the screen.

As described hereinabove, an exemplary message-based conversation operation method of the present invention enables the user to classify conversational messages into groups according to preset conditions and manipulate the message groups. Hence, the user can easily find a desired message and perform message management in a more convenient manner.

If necessary, the mobile terminal 100 may further include various components. That is, although not shown, the mobile terminal 100 may further include a short-range communication module for short-range communication, a data communication interface based on wired and wireless communication, an Internet communication module for Internet access, a digital broadcast receiving module for playing digital broadcasts, and the like. With the digital convergence trend, it should be apparent to those skilled in the art that the mobile terminal 100 may further include a unit comparable to the above-described units, and one unit of the mobile terminal 100 may be removed or replaced with another unit.

The exemplary mobile terminal 100 may be a device capable of providing a menu page and base pages at the same level, and may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smartphone, a laptop computer, a handheld computer, and the like.

In an exemplary implementation, the message-based conversation operation method enables a mobile terminal to classify a large number of messages sent and received during conversations into groups automatically according to preset conditions or user selection. Hence, it is possible to easily find a desired one of the classified messages, and to use the found message to compose a new message or to initiate a new conversation. In addition, as the message groups are presented in an efficient and intuitive way, the user may easily perform message search and manipulation.

While the present has been described and shown in detail with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device for supporting a message-based conversation, the electronic device comprising:
    a display;
    a memory; and
    at least one processor configured to:
        generate a message group by classifying messages exchanged between the electronic device and a specific counterpart electronic device,
        store the message group in the memory,
        control the display to display at least one display item corresponding to the message group in a dialog window, each of the at least one display item comprising an icon display item corresponding to one message group,
        receive a user input selecting a display item among the at least one display item,
        after receiving the user input selecting the display item, transmit a message to the specific counterpart electronic device or receive a message from the specific counterpart electronic device, and
        add the transmitted message or the received message to the message group corresponding to the display item,
    wherein each icon display item comprises a tag region and a time region, the tag region including at least one word extracted from messages included in the message group, the at least one word being extracted based on a number of repetitions of the at least one word in the messages, the time region being arranged at a top portion of each icon display item and configured to include time duration information of the message group, the time duration information including a time duration during which the messages in the message group are exchanged,
    wherein an order of an arrangement of the at least one word included in the tag region is determined based on the number of the repetitions of the at least one word in the messages, and
    wherein the at least one processor is further configured to determine a shape of the at least one display item based on a number of the messages corresponding to the message group, and the shape of the at least one display item is changed according to the number of the messages being changed.

2. The electronic device of claim 1, wherein the at least one processor is further configured to:
identify a time of receipt of the received message or a time of transmission of the transmitted message, and
generate the message group based on the time of receipt or the time of transmission.

3. The electronic device of claim 1, wherein the at least one processor is further configured to:
determine whether the transmitted message or the received message includes a preset word, and
generate the message group based on a result of the determination.

4. The electronic device of claim 1, wherein the at least one processor is further configured to:
receive a user input selecting at least one message, and
in response to receiving the user input selecting the at least one message, generate the message group including the at least one message.

5. The electronic device of claim 1, wherein the at least one processor is further configured to, in response to receiving the user input selecting the display item, control the display to display messages corresponding to the message group in the display item.

6. The electronic device of claim 1, wherein the at least one processor is further configured to:
receive a pinch-to-zoom input selecting the display item, and
in response to receiving the pinch-to-zoom input, control the display to display messages corresponding to the pinch-to-zoom input in a full-screen format.

7. The electronic device of claim 1, wherein the at least one processor is further configured to:
receive a user input dividing the message group, and
in response to receiving the user input dividing the message group, generate at least two message groups by dividing the message group.

8. The electronic device of claim 7,
wherein the user input comprises a swipe input, and
wherein the at least two message groups comprise a first message group and a second message group, the first message group comprising messages divided by the swipe input and the second message group comprising remaining messages.

9. The electronic device of claim 1, wherein the at least one processor is further configured to:
receive a user input merging at least two message groups, and
in response to receiving the user input merging the at least two message groups, generate the message group by merging the at least two message groups.

10. The electronic device of claim 1,
wherein the time region further includes a creation time of the message group, and
wherein the display item further comprises at least one of:
a priority region indicating a priority value assigned to the message group,
the tag region providing tag information comprising key words used in the messages of the message group, or
a subject region providing information regarding the message group.

11. The electronic device of claim 1, wherein the at least one processor is further configured to control the display to display the at least one display item and an ungrouped message.

12. The electronic device of claim 1,
wherein each of the at least one display item further comprises a quick view display item corresponding to one message group,
wherein each quick view display item comprises a view region outputting a plurality of messages, and
wherein the at least one processor is further configured to:
in response to a scroll event occurring in the view region, scroll the plurality of messages and roll upper and lower rolled-up regions in a direction based on the scroll event, and
control the display to display the icon display item together with the quick view display item.

13. The electronic device of claim 1,
wherein the at least one word is displayed as a vertical list in the tag region, a most frequently used word among the at least one word being listed at a top portion of the tag region, and
wherein the tag region is disposed at a right edge of each icon display item.

14. The electronic device of claim 1,
wherein each icon display item further comprises a subject region arranged at a bottom portion of each icon display item directly below the time region, and
wherein the subject region is configured to provide text information of the message group.

15. A method for a message-based conversation operation, the method comprising:
generating a message group by classifying messages exchanged between an electronic device and a specific counterpart electronic device;
storing the message group in a memory;
displaying at least one display item corresponding to the message group in a dialog window, each of the at least one display item comprising an icon display item corresponding to one message group;
receiving a user input selecting a display item among the at least one display item to initiate a new conversation;
after receiving the user input selecting the display item, transmitting a message to the specific counterpart electronic device or receiving a message from the specific counterpart electronic device; and
adding the transmitted message or the received message to the message group corresponding to the display item,
wherein each icon display item comprises a tag region and a time region, the tag region including at least one word extracted from messages included in the message group, the at least one word being extracted based on a number of repetitions of the at least one word in the messages, the time region being arranged at a top portion of each icon display item and configured to include time duration information of the message group, the time duration information including a time duration during which the messages in the message group are exchanged, and
wherein an order of an arrangement of the at least one word included in the tag region is determined based on the number of the repetitions of the at least one word in the messages, and
wherein a shape of the at least one display item is determined based on a number of the messages corresponding to the message group, and the shape of the at least one display item is changed according to the number of the messages being changed.

16. The method of claim 15, wherein the generating of the message group comprises:
- identifying a time of receipt of the received message or a time of transmission of the transmitted message; and
- generating the message group based on the time of receipt or the time of transmission.

17. The method of claim 15, wherein the generating of the message group comprises:
- determining whether the transmitted message or the received message includes a preset word; and
- generating the message group based on a result of the determination.

18. The method of claim 15, wherein the generating of the message group comprises:
- receiving a user input selecting at least one message; and
- in response to receiving the user input selecting the at least one message, generating the message group including the at least one message.

19. The method of claim 15, further comprising: in response to receiving the user input selecting the display item, displaying messages corresponding to the message group in the display item.

20. The method of claim 15, further comprising:
- receiving a pinch-to-zoom input selecting the display item; and
- in response to receiving the pinch-to-zoom input, displaying messages corresponding to the pinch-to-zoom input in a full-screen format.

21. The method of claim 15, further comprising:
- receiving a user input dividing the message group; and
- in response to receiving the user input dividing the message group, generating at least two message groups by dividing the message group,
- wherein the user input comprises a swipe input, and
- wherein the at least two message groups comprise a first message group and a second message group, the first message group comprising messages divided by the swipe input and the second message group comprising remaining messages.

22. The method of claim 15, further comprising:
- receiving a user input merging at least two message groups; and
- in response to receiving the user input merging the at least two message groups, generating the message group by merging the at least two message groups.

23. The method of claim 15, further comprising displaying the at least one display item and an ungrouped message.

* * * * *